(12) United States Patent
Lee et al.

(10) Patent No.: US 8,300,026 B2
(45) Date of Patent: Oct. 30, 2012

(54) TOUCH SENSIBLE DISPLAY DEVICE

(75) Inventors: Joo-Hyung Lee, Gwacheon-si (KR);
Hyung-Guel Kim, Yongin-si (KR);
Kee-Han Uh, Yongin-si (KR); Sang-Jin Pak, Yongin-si (KR)

(73) Assignee: Samsung Display Co., Ltd. (KR)

( * ) Notice: Subject to any disclaimer, the term of this patent is extended or adjusted under 35 U.S.C. 154(b) by 338 days.

(21) Appl. No.: 12/687,101

(22) Filed: Jan. 13, 2010

(65) Prior Publication Data

US 2010/0117980 A1 May 13, 2010

Related U.S. Application Data

(62) Division of application No. 11/286,116, filed on Jan. 22, 2005, now Pat. No. 7,671,833.

(30) Foreign Application Priority Data

Nov. 22, 2004 (KR) .................. 10-2004-0095789
Nov. 22, 2004 (KR) .................. 10-2004-0095986

(51) Int. Cl.
*G06F 3/041* (2006.01)
*G02F 1/136* (2006.01)
(52) U.S. Cl. ........................ 345/173; 349/43
(58) Field of Classification Search .......... 345/104, 345/173
See application file for complete search history.

(56) References Cited

U.S. PATENT DOCUMENTS

| 6,947,102 | B2 | 9/2005 | den Boer et al. |
| 7,184,009 | B2 | 2/2007 | Bergquist |
| 7,280,102 | B2 | 10/2007 | Abileah et al. |
| 2003/0234759 | A1 | 12/2003 | Bergquiest |
| 2004/0046900 | A1* | 3/2004 | Boer et al. ............ 349/43 |
| 2006/0097991 | A1* | 5/2006 | Hotelling et al. ...... 345/173 |

FOREIGN PATENT DOCUMENTS

| JP | 07261932 | 10/1995 |
| JP | 2002314756 | 10/2002 |
| JP | 2003131798 | 5/2003 |
| JP | 2005301373 | 10/2005 |
| KR | 1020040077269 A | 9/2004 |
| WO | 2004097783 | 11/2004 |

* cited by examiner

*Primary Examiner* — Grant Sitta
*Assistant Examiner* — Charles V Hicks
(74) *Attorney, Agent, or Firm* — Innovation Counsel LLP

(57) ABSTRACT

A display device according to an embodiment of the present invention includes: a display panel; a plurality of pixels disposed on the display panel; a plurality of sensor data lines disposed on the display panel and disposed between two adjacent pixels; and a plurality of sensing units disposed on the display panel and disposed between two adjacent pixels.

7 Claims, 15 Drawing Sheets

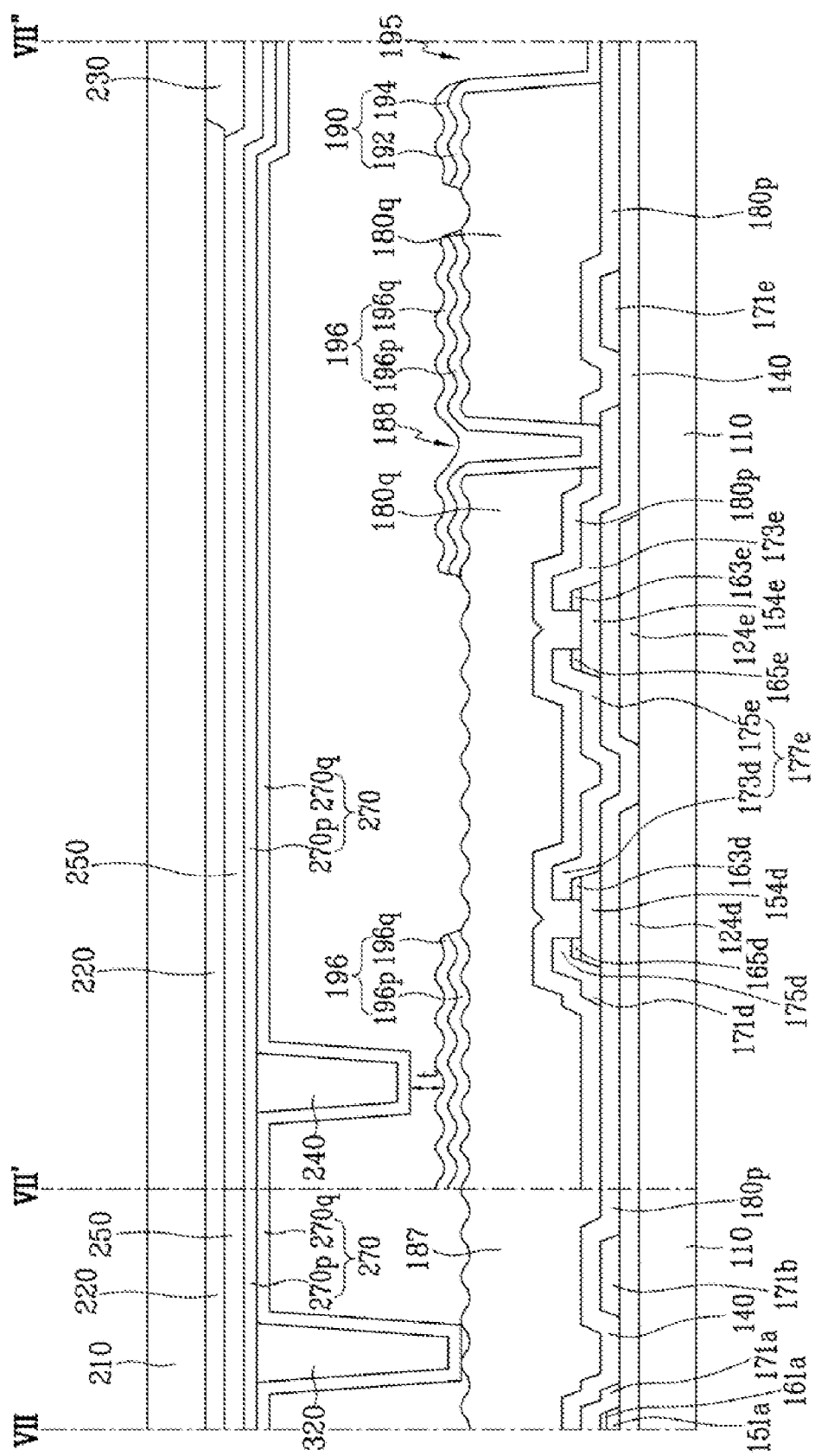

TOUCH SENSIBLE DISPLAY DEVICE

CROSS REFERENCE TO RELATED APPLICATION

This application is a Divisional of U.S. patent application Ser. No. 11/286,116, filed on Nov. 22, 2005, which claims priority from Korean patent application number 10-2004-0095986 filed on Nov. 22, 2004, and Korean patent application number 10-2004-0095789 also filed on Nov. 22, 2004, the contents of both of which are incorporated herein in their entireties by reference.

BACKGROUND OF THE INVENTION (a) Field of the Invention

The present invention relates to a display device and in particular, a touch sensible display device.

(b) Description of Related Art

A liquid crystal display (LCD) includes a pair of panels, one of which is provided with pixel electrodes, and the other of which includes a common electrode. A liquid crystal layer with dielectric anisotropy is interposed between the panels. The pixel electrodes are arranged in a matrix and connected to switching elements such as thin film transistors (TFTs), and receive image data voltages row by row. The common electrode covers the entire surface of one of the two panels and is supplied with a common voltage. A pixel electrode and corresponding portions of the common electrode, and corresponding portions of the liquid crystal layer form a liquid crystal capacitor that as well as a switching element connected thereto is a basic element of a pixel.

An LCD generates electric fields by applying voltages to pixel electrodes and a common electrode and varies the strength of the electric fields to adjust the transmittance of light passing through a liquid crystal layer, thereby displaying images.

A touch screen panel is an apparatus which responds to a touch by a finger or a stylus to write characters, to draw pictures, or to instruct a device such as a computer to execute instructions by using icons. The touch screen panel has its own mechanism to determine whether and where a touch exists and it is typically associated with a display device such as an LCD. However, an LCD which includes a touch screen panel is expensive to manufacture due to the cost of the touch screen panel and has low yield rates due to the difficulty of attaching the touch screen panel to the LCD. Also, the combination results in reduction of the luminance of the LCD and an increase in the thickness of the LCD.

It has been developed that sensors including thin film transistors are incorporated into pixels in an LCD instead of a touch screen panel. A sensor senses the variation of light incident on a panel or the variation of pressure exerted on the panel by user's finger or a stylus to inform the LCD of a touch touches on the screen and where the touch occurred.

The sensors and signal lines for the sensors may occupy a significant area in the display panel and thus the aperture ratio of the LCD may be decreased. In addition, the signal lines for the sensors may be disturbed by signal lines for the pixels.

SUMMARY OF THE INVENTION

A display device according to an embodiment of the present invention includes: a display panel; a plurality of pixels disposed on the display panel; a plurality of sensor data lines disposed on the display panel and disposed between two adjacent pixels; and a plurality of sensing units disposed on the display panel and disposed between two adjacent pixels.

The pixels may include red, green, and blue pixels.

Each of the sensing units may be disposed between dots, each dot including one of the red pixels, one of the green pixels, and one of the blue pixels adjacent to each other.

The display device may further include a plurality of image data lines connected to the pixels and transmitting image data signals, the image data lines including a first data line disposed adjacent to one of the sensing units and cured around the one of the sensing units.

The pixels and the sensing units may be arranged in rows and the sensing units may be arranged symmetrical to a boundary of adjacent rows.

The pixels and the sensing units may be arranged in rows and the sensing units in adjacent rows may be adjacent to each other.

The sensing units may include photo sensing units receiving light, generating an output signal based on the received light, and outputting the output signal to the sensor data lines.

Each of the photo sensing units may include: a photo sensing element receiving ambient light from an opening disposed on the photo sensing element and generating the output signal; and a switching element outputting the output signal in response to a sensor scanning signal.

The display device may further include a plurality of input voltage lines transmitting a sensor input voltage to the sensing elements and disposed between adjacent pixels.

The input voltage lines may cover the sensor data lines.

The sensor input voltage may have a constant value.

The display device may further include a plurality of sensor scanning lines connected to the switching elements, wherein two adjacent sensor data lines are connected to each such that the output signals of the sensing units are superposed.

The sensing units may include pressure sensing units generating an output signal based on a pressure exerted on the display panel and outputting the output signal to the sensor data lines.

Each of the pressure sensing units may include: a switch transmitting a predetermined voltage in response to a pressure; a driving transistor generating an output signal in response to the predetermined voltage; and a switching element outputting the output signal in response to a sensor scanning signal.

Each of the sensing units may include amorphous silicon or polysilicon.

The display device according to an embodiment of the present invention includes: a first substrate; a second substrate facing the first substrate; a plurality of image scanning lines disposed on the second substrate; a plurality of image data lines disposed on the second substrate and intersecting the image scanning lines; a plurality of firs thin film transistors connected to the image scanning lines and the image data lines; a plurality of pixel electrodes coupled to the first thin film transistors; a plurality of sensor scanning lines disposed on the second substrate; a plurality of sensor data lines disposed on the second substrate and intersecting the sensor scanning lines; and a plurality of second thin film transistors connected to the sensor scanning lines and the sensor data lines, wherein the sensor data lines and the second thin film transistors are disposed between two adjacent pixel electrodes.

The display device may further include: a plurality of control voltage lines disposed on the second substrate; a plurality of input voltage lines disposed on the second substrate; and a plurality of third thin film transistors connected to the control voltage lines and the input voltage lines, wherein the input voltage lines and the third thin film transistors are disposed between two adjacent pixel electrodes.

The input voltage lines may cover the sensor data lines.

The input voltage lines may include the same layer as the pixel electrodes.

The image data lines may include first data lines adjacent to the second and the third thin film transistors and curved around the second and the third thin film transistors and the sensor data lines.

The two adjacent pixel electrodes may have different shapes.

The first to the third thin film transistors may include amorphous silicon or poly silicon.

The display device according to an embodiment of the present invention includes: a first substrate; a second substrate facing the first substrate; a plurality of pixel electrodes disposed on the second substrate; a plurality of sensor data lines disposed on the second substrate; and a plurality of pressure sensing units, each of the pressure sensing units comprising a common electrode disposed on the first substrate and a switch electrode disposed on the second substrate, wherein each of the pressure sensing units is disposed between two adjacent pixel electrodes, generates an output signal based on a pressure exerted on the display panel, and outputs the output signal to the sensor data lines in response to sensor scanning signals.

The common electrode may be supplied with a common electrode and the switch electrode may be electrically connected to the common electrode by a touch.

The display device may further include a plurality of risings disposed on the first substrate and projecting toward the switch electrodes, wherein the common electrode is disposed on the risings.

A distance between the common electrode and the switch electrode may be from about 0.1 microns to about 1.0 microns.

The common electrode may include a first electrode and a second electrode and the risings may be disposed between the first electrode and the second electrode.

The first electrode may have a thickness of about 0.05-0.1 microns, the second electrode may have a thickness of about 0.05 0.2 microns.

The display device may further include an organic insulating layer that has depressions and is disposed under the switch electrodes and the pixel electrodes, wherein the switch electrode is disposed on the depressions and the switch electrode has a height lower than a height of the pixel electrodes.

The organic insulating layer may have an unevenness, and the unevenness and the depressions may be simultaneously formed.

The display device may further include a spacer disposed on the first substrate and maintaining a gap between the first substrate and the second substrate, wherein the spacers and the risings have substantially the same height.

The display device may further include a plurality of photo sensing units disposed on the second substrate, disposed between two adjacent pixels, wherein each of the photo sensing units receives light, generates an output signal based on the received light, and outputting the output signal to the sensor data lines.

The display device may further include a plurality of image data lines connected to the pixel electrodes and transmitting image data signals, the image data lines including a first data line disposed adjacent to one of the pressure sensing units and cured around the one of the sensing units.

The image data lines may be arranged symmetrical to a boundary of adjacent pixel electrodes in a row.

Each of the pressure sensing units may include a driving transistor including a control electrode, an input electrode, and an output electrode, and the input electrode may be connected to the switch electrode.

Each of the pressure sensing units may further include a switching element connected to an output terminal of the driving transistor and outputting the output signals.

BRIEF DESCRIPTION OF THE DRAWINGS

The present invention will become more apparent by describing embodiments thereof in detail with reference to the accompanying drawing in which:

FIG. 11 is another exemplary sectional view of the panel assembly shown in FIG. 6 taken along lines X-X' and X'-X";

DETAILED DESCRIPTION OF THE PREFERRED EMBODIMENTS

Figure 1:
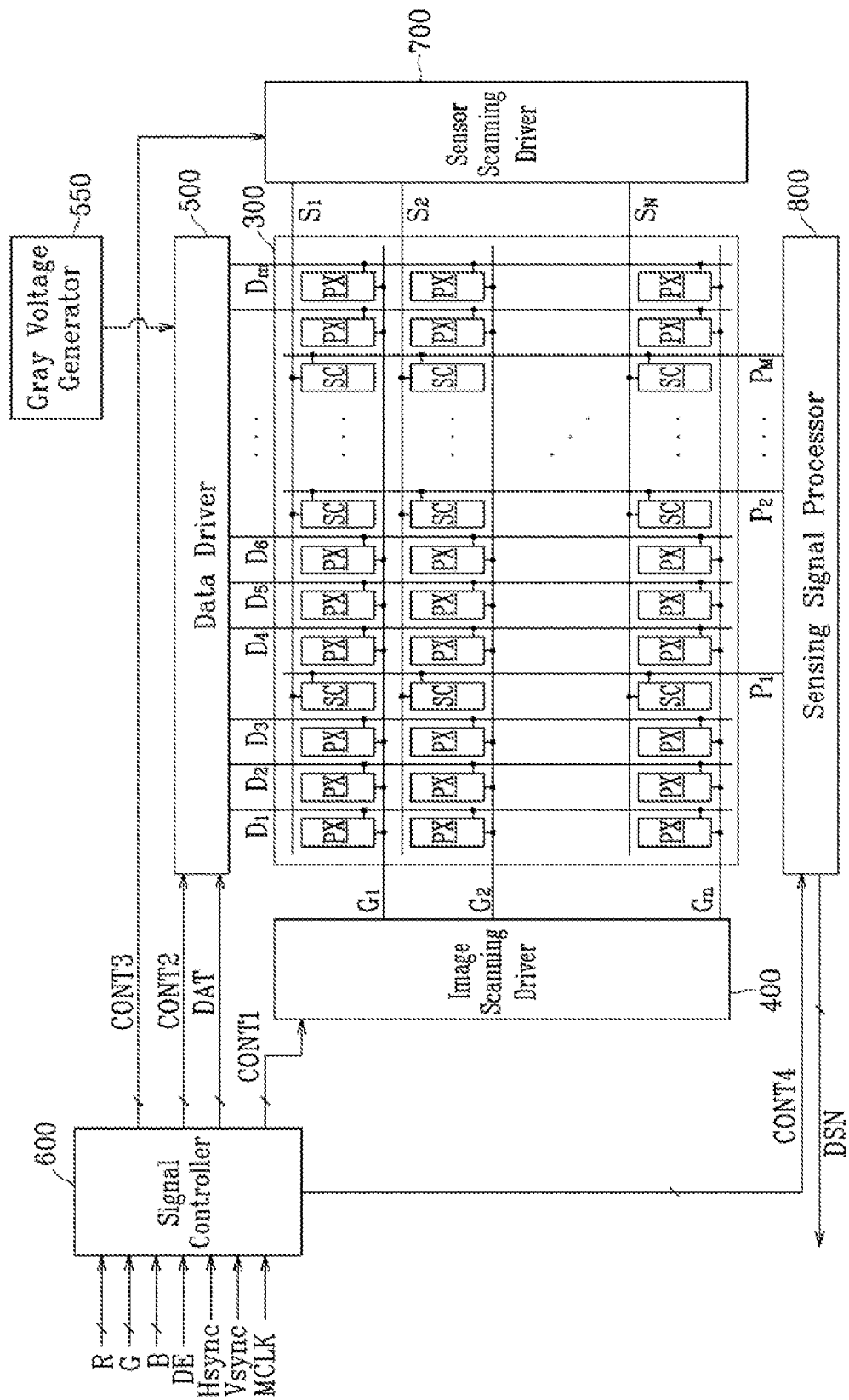
FIG. 1 is a block diagram of an LCD according to an embodiment of the present invention.

The present invention is described more fully hereinafter with reference to the accompanying drawings, in which preferred embodiments of the invention are shown.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

A liquid crystal display according to an embodiment of the present invention now will be described in detail with reference to FIGS. 1, 2, 3 and 4.

Figure 2:
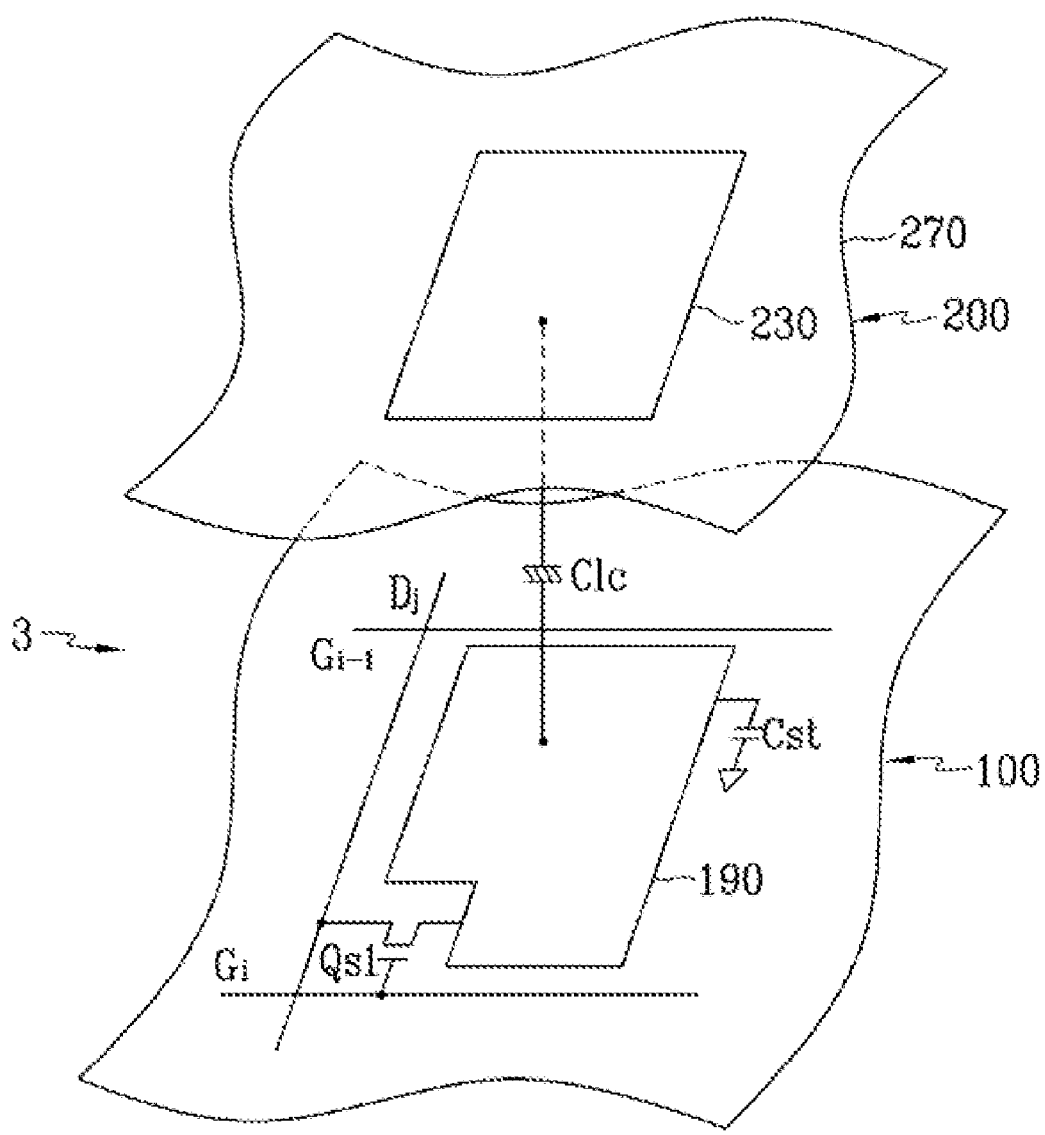
FIG. 2 is an equivalent circuit diagram of a pixel of an LCD according to an embodiment of the present invention.
Figure 3:
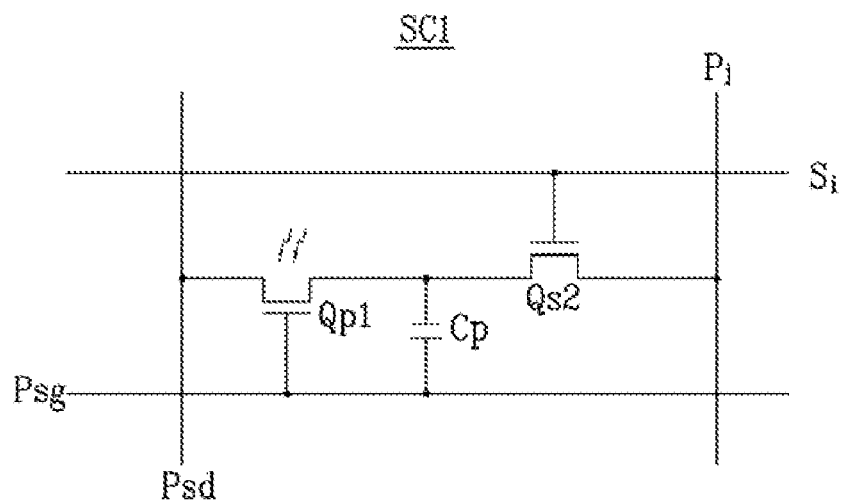
FIG. 3 is an equivalent circuit diagram of a pixel including a photo sensing unit of an LCD according to an embodiment of the present invention.
Figure 4:
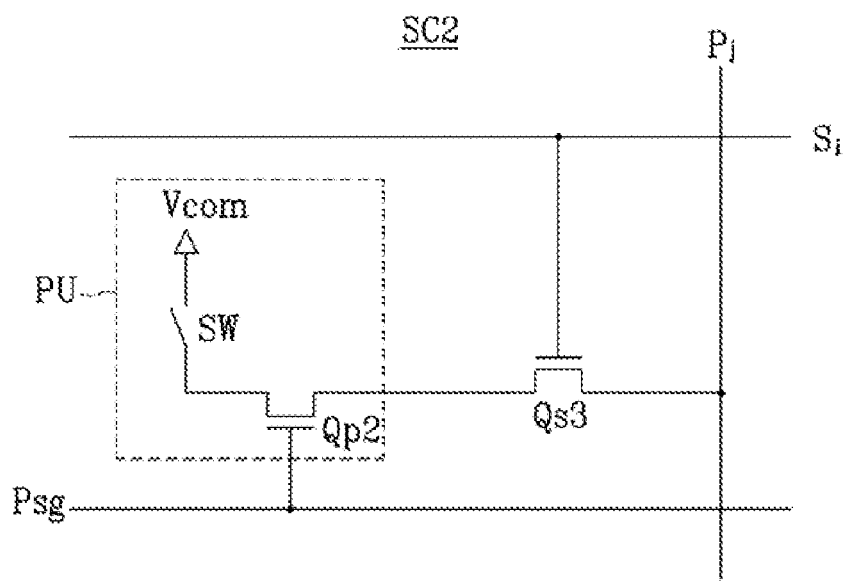
FIG. 4 is an equivalent circuit diagram of a pixel including a pressure sensing unit of an LCD according to an embodiment of the present invention.

FIG. 1 is a block diagram of an LCD according to an embodiment of the present invention. FIG. 2 is an equivalent circuit diagram of a pixel of an LCD according to an embodiment of the present invention. FIG. 3 is an equivalent circuit diagram of a pixel including a photo sensing unit of an LCD according to an embodiment of the present invention, and FIG. 4 is an equivalent circuit diagram of a pixel including a pressure sensing unit of an LCD according to an embodiment of the present invention.

Referring to FIG. 1, an LCD according to an embodiment includes a liquid crystal (LC) panel assembly 300, an image scanning driver 400, an image data driver 500, a sensor scanning driver 700, and a sensing signal processor 800 that are coupled with the panel assembly 300, a gray voltage generator 550 coupled with the image data driver 500, and a signal controller 600 controlling the above elements.

Referring to FIGS. 1-4, the panel assembly 300 includes a plurality of display signal lines $G_1$-$G_n$ and $D_1$-$D_m$, a plurality of sensor signal lines $S_1$-$S_N$, $P_1$-$P_M$, Psg and Psd, a plurality of pixels PX connected to the display signal lines $G_1$-$G_n$ and $D_1$-$D_m$ and arranged substantially in a matrix, and a plurality of sensing units SC connected to the sensor signal lines $S_1$-$S_N$, $P_1$-$P_M$, Psg and Psd and arranged substantially in a matrix. In a structural view shown in FIG. 2, the panel assembly 300 includes a lower panel 100 and an upper panel 200 facing each other and a liquid crystal (LC) layer 3 interposed between the lower panel 100 and the upper panel 200.

The display signal lines include a plurality of image scanning lines $G_1$-$G_n$ transmitting image scanning signals and a plurality of image data lines $D_1$-$D_m$ transmitting image data signals.

The sensor signal lines include a plurality of a plurality of sensor scanning lines $S_1$-$S_N$ transmitting sensor scanning signals, a plurality of sensor data lines $P_1$-$P_M$ transmitting sensor data signals, a plurality of control voltage lines Psg, shown in FIGS. 3 and 4, transmitting a sensor control voltage, and a plurality of input voltage lines Psd, shown in FIG. 3, transmitting a sensor input voltage.

The image scanning lines $G_1$-$G_n$ and the sensor scanning lines $S_1$-$S_N$ extend substantially in a row direction and substantially parallel to each other, while the image data lines $D_1$-$D_m$ and the sensor data lines $P_1$-$P_M$ extend substantially in a column direction and substantially parallel to each other. Referring to FIG. 2, each pixel PX, for example, a pixel in the i-th row (i=1, 2, . . . , n) and the j-th column (j=1, 2, . . . , m) includes a switching element Qs1 connected to an image scanning line $G_i$ and an image data line $D_j$, and a LC capacitor Clc and a storage capacitor Cst that are connected to the switching element Qs1. The storage capacitor Cst may be omitted.

The switching element Qs1 is disposed on the lower panel 100 and it has three terminals, i.e., a control terminal connected to the image scanning line $G_i$, an input terminal connected to the image data line $D_j$, and an output terminal connected to the LC capacitor Clc and the storage capacitor Cst.

The LC capacitor Clc includes a pixel electrode 190 disposed on the lower panel 100 and a common electrode 270 disposed on the upper panel 200 as two terminals. The LC layer 3 disposed between the two electrodes 190 and 270 functions as dielectric of the LC capacitor Clc. The pixel electrode 190 is connected to the switching element Qs1, and the common electrode 270 is supplied with a common voltage Vcom and covers an entire surface of the upper panel 200.

Unlike FIG. 2, the common electrode 270 may be provided on the lower panel 100, and at least one of the electrodes 190 and 270 may have a shape of bar or stripe.

The storage capacitor Cst is an auxiliary capacitor for the LC capacitor Clc. The storage capacitor Cst includes the pixel electrode 190 and a separate signal line, which is provided on the lower panel 100, overlaps the pixel electrode 190 via an insulator, and is supplied with a predetermined voltage such as the common voltage Vcom. Alternatively, the storage capacitor Cst includes the pixel electrode 190 and an adjacent gate line called a previous gate line, which overlaps the pixel electrode 190 via an insulator.

For color display, each pixel uniquely represents one of primary colors (i.e., spatial division) or each pixel sequentially represents the primary colors in turn (i.e., temporal division) such that spatial or temporal sum of the primary colors are recognized as a desired color. An example of a set of the primary colors includes red, green, and blue colors. FIG. 2 shows an example of the spatial division that each pixel includes a color filter 230 representing one of the primary colors in an area of the upper panel 200 facing the pixel electrode 190. Alternatively, the color filter 230 is provided on or under the pixel electrode 190 on the lower panel 100.

Hereinafter, a pixel including a red/green/blue color filter 230 is referred to as a red/green/blue pixel. One or more polarizers (not shown) are attached to at least one of the panels 100 and 200. In addition, one or more retardation films (not shown) for compensating refractive anisotropy may be disposed between the polarizer(s) and the panel(s).

The sensing units SC include a plurality of photo sensing units SC1 and a plurality of pressure sensing units SC2, which are exclusively disposed. Each of the photo sensing units SC1 shown in FIG. 3 includes a photo sensing element Qp1 connected to a control voltage line Psg and an input voltage line Psd, a sensor capacitor Cp connected to the photo sensing element Qp1, and a switching element Qs2 connected to a sensor scanning line $S_i$, the photo sensing element Qp1, and a sensor data line $P_j$.

The photo sensing element Qp1 has three terminals, i.e., a control terminal connected to the control voltage line Psg to be biased by the sensor control voltage, an input terminal connected to the input voltage line Psd to be biased by the sensor input voltage, and an output terminal connected to the switching element Qs2. The photo sensing element Qp1 includes a photoelectric material that generates a photocurrent upon receipt of light. An example of the photo sensing element Qp1 is a thin film transistor having an amorphous silicon or polysilicon channel that can generate a photocurrent. The sensor control voltage applied to the control terminal of the photo sensing element Qp1 is sufficiently low or sufficiently high to keep the photo sensing element Qp1 in an off state without incident light. The sensor input voltage applied to the input terminal of the photo sensing element Qp1 is sufficiently high or sufficiently low to keep the photocurrent flowing in a direction. The photocurrent flows toward the switching element Qs2 by the sensor input voltage and it also flows into the sensor capacitor Cp to charge the sensor capacitor Cp.

The sensor capacitor Cp is connected between the control terminal and the output terminal of the photo sensing element Qp1. The sensor capacitor Cp stores electrical charges output from the photo sensing element Qp1 to maintain a predetermine voltage. The sensor capacitor Cp may be omitted.

The switching element Qs2 also has three terminals, i.e., a control terminal connected to the sensor scanning line $S_i$, an input terminal connected to the output terminal of the photo sensing element Qp1, and an output terminal connected to the sensor data line $P_j$. The switching element Qs2 outputs a sensor output signal to the sensor data line $P_j$ in response to the sensor scanning signal from the sensor scanning line $S_i$. The sensor output signal is the sensing current from the photo sensing element Qp1. However, the sensor output signal may be a voltage stored in the sensor capacitor Cp.

Each of the pressure sensing units SC2 shown in FIG. 4 includes a pressure sensing element PU connected to the common voltage Vcom and a control voltage line Psg, and a switching element Qs3 connected to a sensor scanning line $S_i$, the pressure sensing element PU, and a sensor data line $P_j$.

The pressure sensing element PU includes a pressure switch SW connected to the common voltage Vcom, and a driving transistor Qp2 connected between the switch SW and the switching element Qs3.

The pressure switch SW connects the driving transistor Qp2 to the common voltage Vcom under a pressure following a touch exerted on the panel assembly 300. For example, the pressure may make an electrode (not shown) supplied with the common voltage Vcom approach a terminal of the driving transistor Qp2 to be in contact therewith. However, the switch SW may use another physical quantity for connecting the driving transistor Qp2 to the common voltage Vcom and in this case, the pressure sensing element PU and the pressure switch SW may be referred to as other names.

The driving transistor Qp2 has three terminals, i.e., a control terminal connected to the control voltage line Psg to be biased by the sensor control voltage, an input terminal connected to the switch SW, and an output terminal connected to the switching element Qs3. The driving transistor Qp2 generates and outputs an electrical current upon receipt of the common voltage Vcom from the switch SW.

The switching element Qs3 also has three terminals, i.e., a control terminal connected to the sensor scanning line $S_i$, an input terminal connected to the output terminal of the driving transistor Qp2, and an output terminal connected to the sensor data line $P_j$. The switching element Qs3 outputs the current from the driving transistor Qp2 to the sensor data line $P_j$ as a sensor output signal in response to the sensor scanning signal from the sensor scanning line $S_i$.

The switching elements Qs1, Qs2 and Qs3, the photo sensing element Qp1, and the driving transistor Qp2 may be amorphous silicon or polysilicon thin film transistors (TFTs).

The sensing units SC are disposed in an area (referred to as a "sensor area" hereinafter) between adjacent pixels PX. In addition, a concentration of the sensing units SC1 is equal to a concentration of dots, where a dot is a basic unit for representing a color and includes a set of different-colored pixels. The set of pixels may include a red pixel, a green pixel, and a blue pixel sequentially arranged in a row.

However, the concentration of the sensing units SC may be smaller than the concentration of dots. For example, the concentration of the photo sensing units SC1 may be equal to about one quarter of the concentration of dots, and the pressure sensing units SC2 may have a resolution equal to or smaller than the resolution of the photo sensing units SC1. Such an LCD can be used in a precision application such as character recognition. The concentration of the photo sensing units SC1 may be higher or lower.

Two adjacent sensor scanning lines $S_1$-$S_N$ may be connected to each other such that the sensor output signals of the photo sensing units SC1 connected to the sensor scanning lines are superposed to form a sensor data signal. This configuration may reduce the variation of the characteristics of the photo sensing units SC1, and the generated sensor data signal may have a doubled signal-to-noise ratio to contain more precise touch information.

Although the pressure sensing unit SC2 indicates the existence of a touch, it may not identify the precise position of the touch since the pressure of the touch may cover a wide area. However, the photo sensing unit SC1 identifies the precise position of a touch by sensing the variation of light illuminance caused by a shadow of the object, however it may not correctly identify the existence of the touch since the variation of illuminance can be generated by various causes other than a touch. For example, an object which is disposed near the panel assembly 300, but does not touch the panel assembly 300 may vary the light illuminance.

The photo sensing unit SC1 and the pressure sensing unit SC2 may be substituted with sensing units that sense two physical quantities other than pressure and light. Sensing one of the two physical quantities may indicate the existence of a touch, and sensing the other quantity may inform the position of the touch. The touch may vary the former physical quantity in a wide region, while the touch may vary the latter physical quantity in a narrow region. The former physical quantity may not be easily varied by a stimulus other than a touch, while the latter physical quantity may be easily varied by a stimulus other than a touch. The sensing units SC for sensing the former physical quantity may include a switch that turns on/off to generate a bistate output signal in response to a variation of the former physical quantity larger than a predetermined value. The sensing units SC for sensing the latter physical quantity may generate an indication signal having continuous or multiple values depending on the magnitude of the latter physical quantity.

Referring to FIG. 1 again, the gray voltage generator 550 generates two sets of a plurality of gray voltages related to the transmittance of the pixels. The gray voltages in one set have a positive polarity with respect to the common voltage Vcom, while those in the other set have a negative polarity with respect to the common voltage Vcom.

The image scanning driver 400 is connected to the image scanning lines $G_1$-$G_n$ of the panel assembly 300 and synthesizes a gate-on voltage Von and a gate-off voltage Voff to generate the image scanning signals for application to the image scanning lines $G_1$-$G_n$.

The image data driver 500 is connected to the image data lines $D_1$-$D_m$ of the panel assembly 300 and applies image data signals, which are selected from the gray voltages supplied from the gray voltage generator 800, to the image data lines $D_1$-$D_m$.

The sensor scanning driver 700 is connected to the sensor scanning lines $S_1$-$S_N$ of the panel assembly 300 and synthesizes a gate-on voltage Von and a gate-off voltage Voff to generate the sensor scanning signals for application to the sensor scanning lines $S_1$-$S_N$.

The sensing signal processor 800 is connected to the sensor data lines $P_1$-$P_M$ of the display panel 300 and receives and analog-to-digitally converts the sensor data signals from the sensor data lines $P_1$-$P_M$ to generate digital sensor data signals DSN. The sensor data signals carried by the sensor data lines $P_1$-$P_M$ may be current signals and in this case, the sensing signal processor 800 converts the current signals into voltage signals before the analog-to-digital conversion. One sensor data signal carried by one sensor data line $P_1$-$P_M$ at a time may include one sensor output signal from one switching elements Qs2 or may include at least two sensor output signals outputted from at least two switching elements Qs2.

The signal controller 600 controls the image scanning driver 400, the image data driver 500, the sensor scanning driver 700, and the sensing signal processor 800, etc.

Each of the processing units 400, 500, 600, 700 and 800 may include at least one integrated circuit (IC) chip mounted on the LC panel assembly 300 or on a flexible printed circuit (FPC) film in a tape carrier package (TCP) type, which are attached to the panel assembly 300. Alternately, at least one of the processing units 400, 500, 600, 700 and 800 may be integrated into the panel assembly 300 along with the signal lines $G_1$-$G_m$, $D_1$-$D_m$, $S_1$-$S_N$, $P_1$-$P_M$, Psg and Psd, the switching elements Qs1, Qs2 and Qs3, and the photo sensing elements Qp1. Alternatively, all the processing units 400, 500, 600, 700 and 800 may be integrated into a single IC chip, but at least one of the processing units 400, 500, 600, 700 and 800 or at least one circuit element in at least one of the processing units 400, 500, 600, 700 and 800 may be disposed out of the single IC chip.

The operation of the above-described LCD is described below in detail.

The signal controller 600 is supplied with input image signals R, G and B and input control signals for controlling the display thereof from an external graphics controller (not shown). The input control signals include a vertical synchronization signal Vsync, a horizontal synchronization signal Hsync, a main clock MCLK, and a data enable signal DE.

On the basis of the input control signals and the input image signals R, G and B, the signal controller 600 generates image scanning control signals CONT1, image data control signals CONT2, sensor scanning control signals CONT3, and sensor data control signals CONT4 and it processes the image signals R, G and B suitable for the operation of the display panel 300. The signal controller 600 sends the scanning control signals CONT1 to the image scanning driver 400, the processed image signals DAT and the data control signals CONT2 to the data driver 500, the sensor scanning control signals CONT3 to the sensor scanning driver 700, and the sensor data control signals CONT4 to the sensing signal processor 800.

The image scanning control signals CONT1 include an image scanning start signal STV for instructing to start image scanning and at least one clock signal for controlling the output time of the gate-on voltage Von. The image scanning control signals CONT1 may include an output enable signal OE for defining the duration of the gate-on voltage Von.

The image data control signals CONT2 include a horizontal synchronization start signal STH for informing of start of image data transmission for a group of pixels PX, a load signal LOAD for instructing to apply the image data signals to the image data lines $D_1$-$D_m$, and a data clock signal HCLK. The image data control signal CONT2 may further include an inversion signal RVS for reversing the polarity of the image data signals (with respect to the common voltage Vcom.

Responsive to the image data control signals CONT2 from the signal controller 600, the data driver 500 receives a packet of the digital image signals DAT for the group of pixels PX from the signal controller 600, converts the digital image signals DAT into analog image data signals selected from the gray voltages supplied from the gray voltage generator 800, and applies the analog image data signals to the image data lines $D_1$-$D_m$.

The image scanning driver 400 applies the gate-on voltage Von to an image scanning line $G_1$-$G_n$ in response to the image scanning control signals CONT1 from the signal controller 600, thereby turning on the switching transistors Qs1 connected thereto. The image data signals applied to the image data lines $D_1$-$D_m$ are then supplied to the pixels PX through the activated switching transistors Qs1.

The difference between the voltage of an image data signal and the common voltage Vcom is represented as a voltage across the LC capacitor Clc, which is referred to as a pixel voltage. The LC molecules in the LC capacitor Clc have orientations depending on the magnitude of the pixel voltage, and the molecular orientations determine the polarization of light passing through the LC layer 3. The polarizer(s) converts the light polarization into the light transmittance to display images.

By repeating this procedure by a unit of a horizontal period (also referred to as "1H" and equal to one period of the horizontal synchronization signal Hsync and the data enable signal DE), all image scanning lines $G_1$-$G_n$ are sequentially supplied with the gate-on voltage Von, thereby applying the image data signals to all pixels PX to display an image for a frame.

When the next frame starts after one frame finishes, the inversion control signal RVS applied to the data driver 500 is controlled such that the polarity of the image data signals is reversed (which is referred to as "frame inversion"). The inversion control signal RVS may be also controlled such that the polarity of the image data signals flowing in a data line are periodically reversed during one frame (for example, row inversion and dot inversion), or the polarity of the image data signals in one packet are reversed (for example, column inversion and dot inversion).

Concurrently, the sensor scanning driver 700 applies the gate-off voltage to the sensor scanning lines $S_1$-$S_N$ to turn on the switching elements Qs2 and Qs3 connected thereto in response to the sensing control signals CONT3. Then, the switching elements Qs2 and Qs3 output sensor output signals to the sensor data lines $P_1$-$P_M$ to form sensor data signals, and the sensor data signals are inputted into the sensing signal processor 800.

The sensing signal processor 800 processes, for example, amplifies and filters the read sensor data signals and converts the analog sensor data signals into digital sensor data signals DSN to be sent to an external device (not shown) in response to the sensor data control signals CONT4. The external device appropriately processes signals form the sensing signal processor 800 to determine whether and where a touch exists. The external device 600 sends image signals generated based on the touch information to the LCD.

The sensing operation may be performed independently of the display operation. The sensing operation repeats in one or several horizontal periods depending on the concentration of the sensing units. The sensing operation may not be performed every frame, but it may be performed every two or more frames.

A detailed structure of an LC panel assembly including a photo sensing unit according to embodiments of the present invention is described below in detail with reference to FIGS. 5, 6, 7, 8, 9, 10 and 11.

Figure 5:
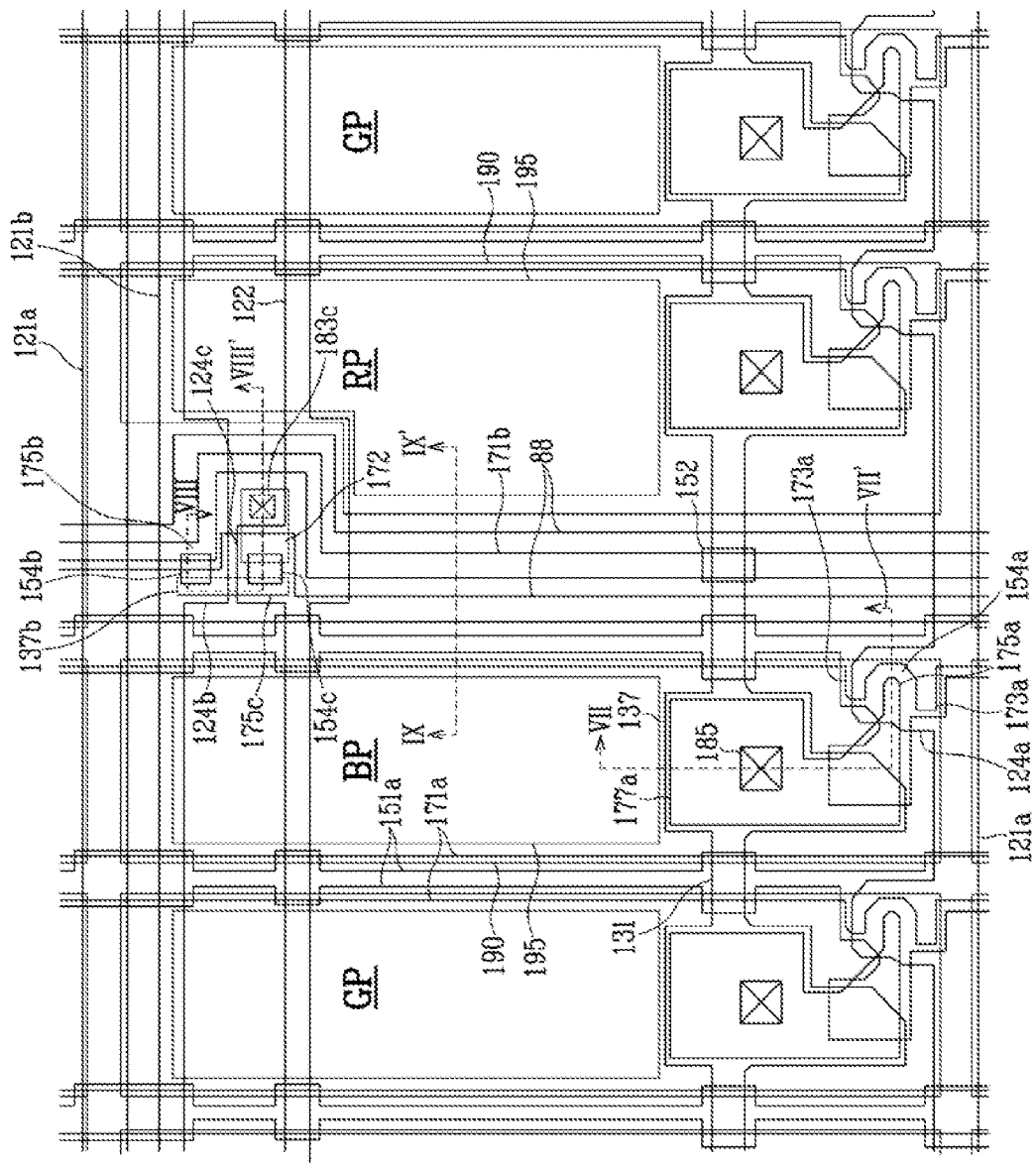
FIGS. 5 and 6 are layout views of a LC panel assembly according to an embodiment of the present invention.
Figure 6:
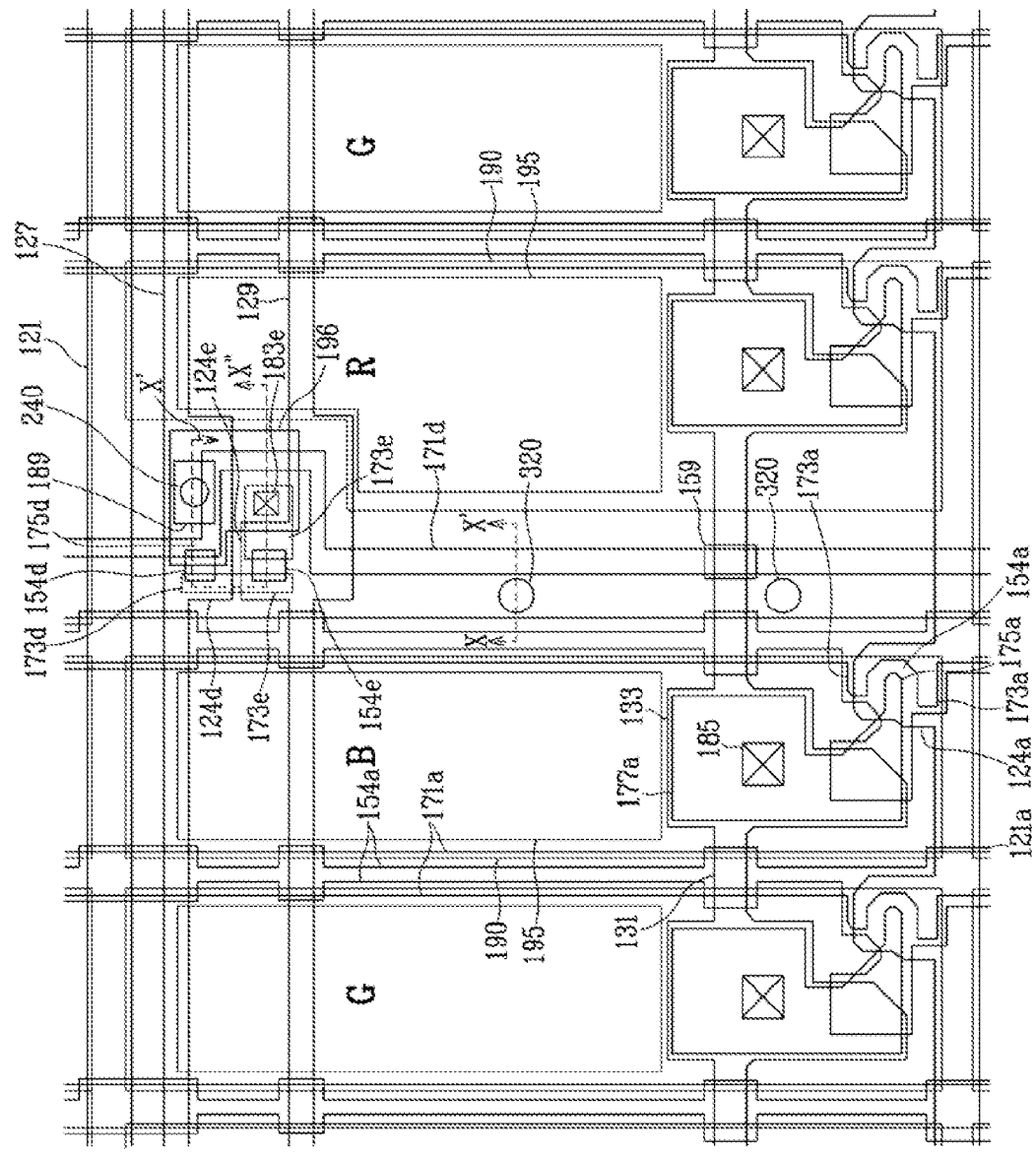
Figure 7:
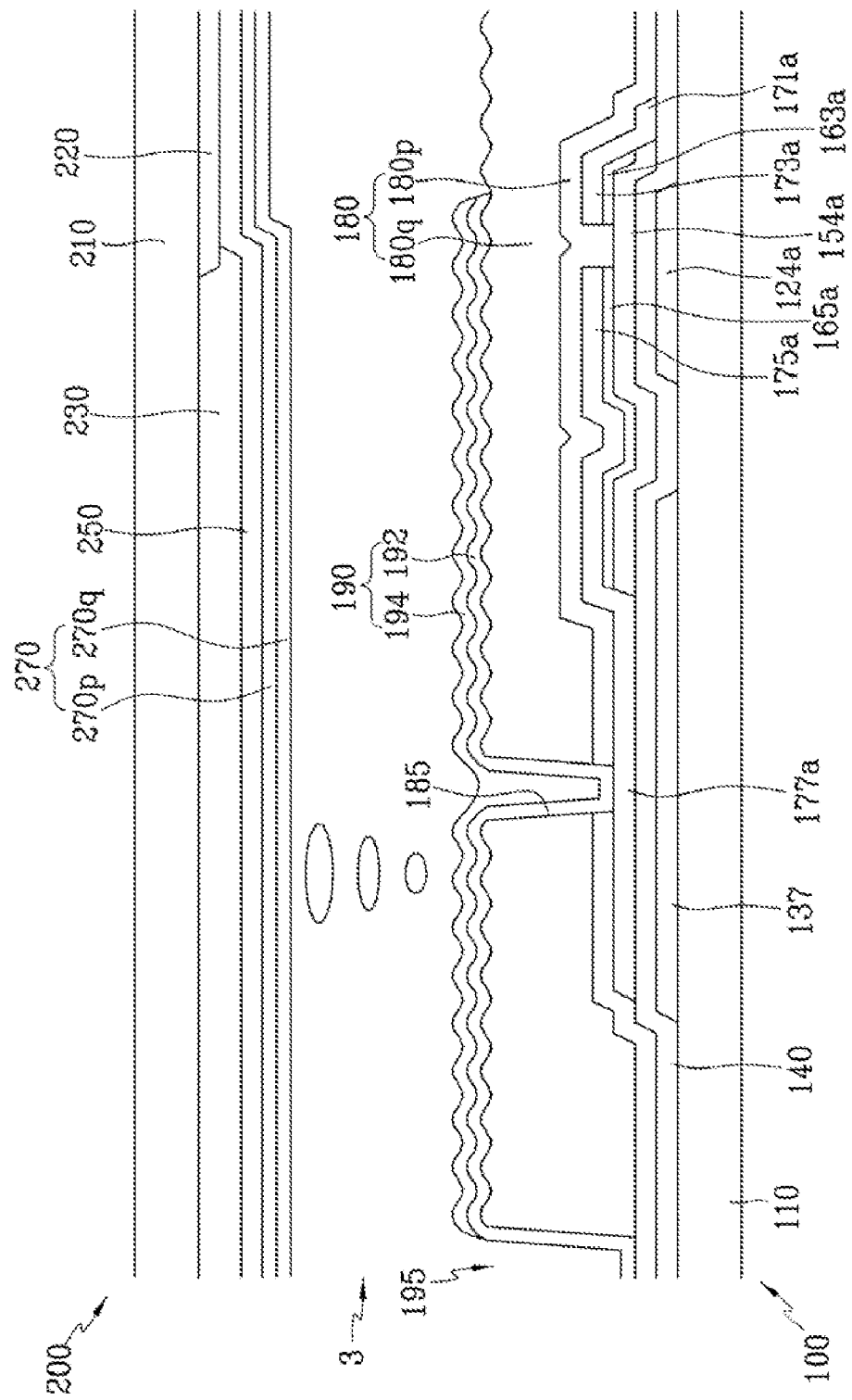
FIG. 7 is a sectional view of the panel assembly shown in FIG. 5 taken along line VII-VII'.
Figure 8:
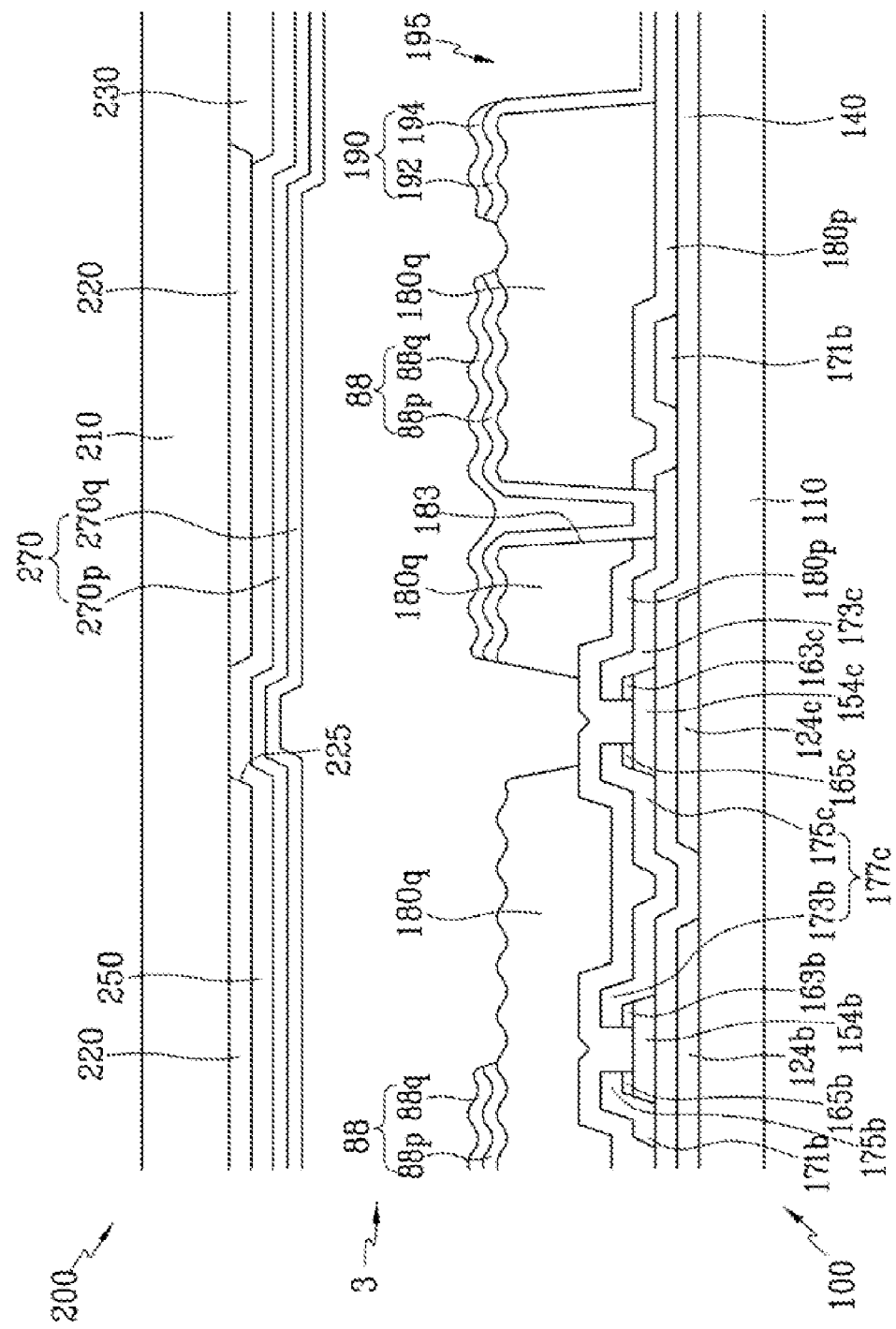
FIG. 8 is a sectional view of the panel assembly shown in FIG. 5 taken along line VIII-VIII'.
Figure 9:
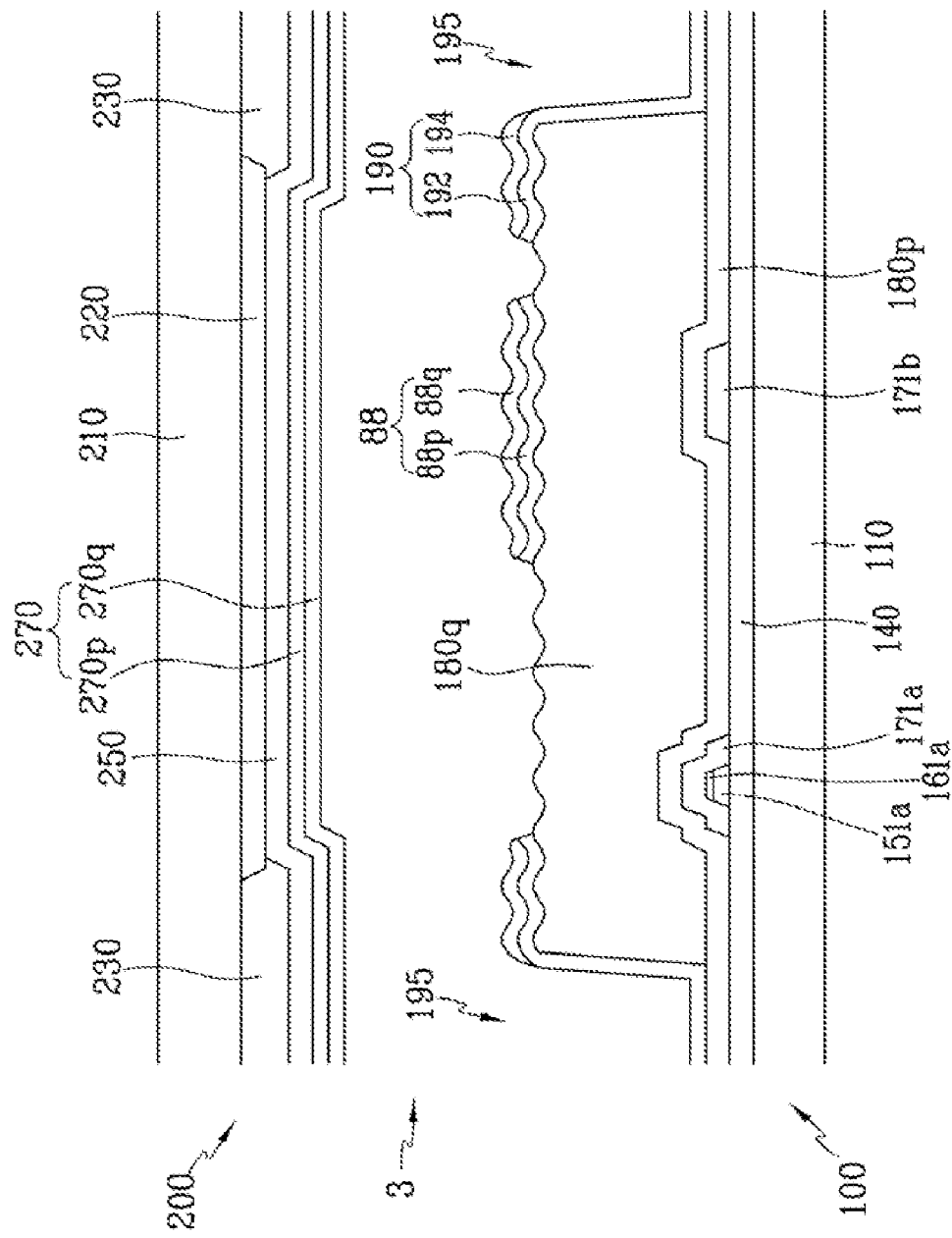
FIG. 9 is a sectional view of the panel assembly shown in FIG. 5 taken along line IX-IX'.
Figure 10:
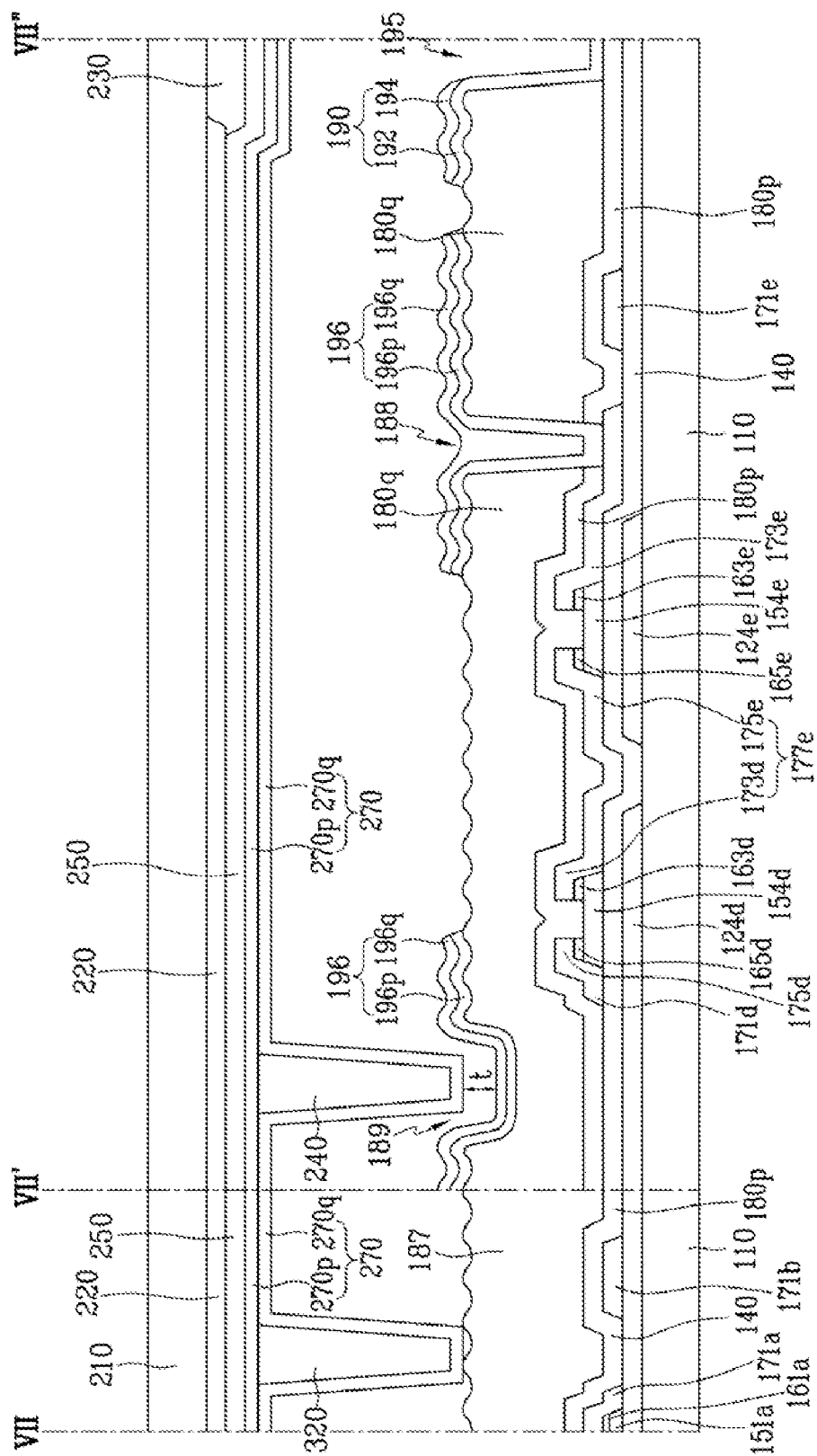
FIG. 10 is an exemplary sectional view of the panel assembly shown in FIG. 6 taken along lines X-X' and X'-X"

FIGS. 5 and 6 are layout views of an LC panel assembly according to an embodiment of the present invention. FIG. 7 is a sectional view of the panel assembly shown in FIG. 5 taken along line VII-VII'. FIG. 8 is a sectional view of the panel assembly shown in FIG. 5 taken along line VIII-VIII' and FIG. 9 is a sectional view of the panel assembly shown in FIG. 5 taken along line IX-IX'. FIG. 10 is an exemplary sectional view of the panel assembly shown in FIG. 6 taken along lines X-X' and X'-X". FIG. 11 is another exemplary sectional view of an LC panel assembly shown in FIG. 6 taken along lines X-X' and X'-X".

It is noted that FIGS. 5, 7, 8 and 9 illustrate an area near a photo sensing unit SC1, and FIGS. 6, 10 and 11 illustrate an area near a pressure sensing unit SC2.

A LC panel assembly according to an embodiment of the present invention includes a TFT array panel 100, a common electrode panel 200 facing the TFT array panel, and a LC layer 3 interposed between the panels 100 and 200.

The TFT array panel 100 is described below in detail.

A plurality of gate conductors including a plurality of image scanning lines 121a, a plurality of storage electrode lines 131, a plurality of sensor scanning lines 121b, and a plurality of control voltage lines 122 are formed on an insulating substrate 110 such as transparent glass or plastic.

The image scanning lines 121a transmit image scanning signals and extend substantially in a transverse direction. Each of the image scanning lines 121a includes a plurality of first control electrodes 124a projecting downward.

The storage electrode lines 131 are supplied with a predetermined voltage such as a common voltage and extend substantially parallel to the image scanning lines 121a. Each of the storage electrode lines 131 is disposed close to an image scanning line 121a and includes a plurality of storage electrodes 137 expanding upward and downward.

The sensor scanning lines 121b transmit sensor scanning signals and extend substantially parallel to the image scanning lines 121a. Each of the sensor scanning lines 121b is disposed between two adjacent image scanning lines 121a and closer to an upper one of the two image scanning lines 121a. The sensor scanning lines 121b include a plurality of second control electrodes 124b (shown in FIGS. 5 and 7-9) and third control electrodes 124d (shown in FIGS. 6, 10 and 11) projecting downward.

The control voltage lines 122 are supplied with a sensor control voltage and extend substantially parallel to the sensor scanning lines 121b. Each of the control voltage lines 122 is disposed close to a sensor scanning line 121b and includes a plurality of fourth control electrodes 124c projecting upward toward the second control electrodes 124b and a plurality of fifth control electrodes 124e projecting upward toward the third control electrodes 124d.

The gate conductors 121a, 121b, 122 and 131 are preferably made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, they may have a multi-layered structure including two conductive films (not shown) having different physical characteristics. One of the two films is preferably made of low resistivity metal including Al containing metal, Ag containing metal, and Cu containing metal for reducing signal delay or voltage drop. The other film is preferably made of material such as Mo containing metal, Cr, Ta, or Ti, which has good physical, chemical, and electrical contact characteristics with other materials such as indium tin oxide (ITO) or indium zinc oxide (IZO). Good examples of the combination of the two films are a lower Cr film and an upper Al (alloy) film and a lower Al (alloy) film and an upper Mo (alloy) film. However, the gate conductors 121a, 121b, 122 and 131 may be made of various metals or conductors.

The lateral sides of the gate conductors 121a, 121b, 122 and 131 are inclined relative to a surface of the substrate 110, and the inclination angle thereof ranges about 30-80 degrees.

A gate insulating layer 140 preferably made of silicon nitride (SiNx) or silicon oxide (SiOx) is formed on the gate conductors 121a, 121b, 122 and 131.

A plurality of semiconductor stripes 151a and a plurality of semiconductor islands 154b, 154c, 154d, 154e and 152 are formed on the gate insulating layer 140. The semiconductor stripes and islands 151a, 154b-154e and 152 are preferably made of hydrogenated amorphous silicon (abbreviated to "a-Si") or polysilicon.

The semiconductor stripes 151a extend substantially in a longitudinal direction and become wide near the scanning lines 121a and 121b, the storage electrode lines 131, and the control voltage lines 122 such that the semiconductor stripes 151a cover large areas of the scanning lines 121a and 121b, the storage electrode lines 131, and the control voltage lines 122. Each of the semiconductor stripes 151a has a plurality of projections 154a disposed on the first control electrodes 124a.

The semiconductor islands 154b, 154c, 154d and 154e are disposed on the second, the fourth, the third, and the fifth control electrodes 124b, 124c, 124d and 124e, respectively. The semiconductor islands 152 are disposed on the scanning lines 121a and 121b, the storage electrode lines 131, and the control voltage lines 122.

A plurality of ohmic contact stripes 161a and a plurality of first ohmic contact islands 165a are formed on the semiconductor stripes 151a, a plurality of second and third ohmic contact islands 163b and 165b are formed on the semiconductor islands 154b, a plurality of fourth and fifth ohmic contact islands 163d and 165d are formed on the semiconductor islands 154d, a plurality of sixth and seventh ohmic contact islands 163c and 165c are formed on the semiconductor islands 154c, and a plurality of eighth and ninth ohmic contact islands 163e and 165e are formed on the semiconductor islands 154e. In addition, a plurality of other ohmic contact islands (not shown) are formed on the semiconductor islands 152. The ohmic contacts 161a, 163b-163e and 165a-165e are preferably made of silicide or n+ hydrogenated a-Si heavily doped with n type impurity such as phosphorous.

Each of the ohmic contact stripes 161a includes a plurality of projections 163a, and the projections 163a and the first ohmic contact islands 165a are located in pairs on the projections 154a of the semiconductor stripes 151a.

The lateral sides of the semiconductor stripes and islands 151a, 154b-154e and 152 and the ohmic contacts 161a, 163b-163e and 165a-165e are inclined relative to the surface of the substrate 110, and the inclination angles thereof are preferably in a range of about 30-80 degrees.

A plurality of data conductors including a plurality of image data lines 171a including first input electrodes 173a, a plurality of sensor data lines 171b and 171d, a plurality of electrode members 177c including second input electrodes 173b, a plurality of electrode members 177e including third input electrodes 173d, a plurality of fourth and fifth input electrodes 173c and 173e, and a plurality of first output electrodes 175a are formed on the ohmic contacts 161a, 163b-163e and 165a-165e and the gate insulating layer 140.

The image data lines 171a transmit image data signals and extend substantially in the longitudinal direction substantially in a rectilinear manner to intersect the scanning lines 121a and 121b, the storage electrode lines 131, and the control voltage lines 122. The first input electrodes 173a project from the image data lines 171a toward the first control electrodes 124a. Some of the image data lines 171a are disposed near the second and the fourth control electrodes 124b and 124c or near the third and the fifth control electrodes 124d and 124e, which are disposed right to the image data lines 171a.

The first output electrodes 175a are separated from the data lines 171a and 171b and disposed opposite the first input electrodes 173a with respect to the first control electrodes 124a. Each of the first output electrodes 175a includes a wide end portion 177a and a narrow end portion. The wide end portion 177a overlaps a storage electrode 137 and the narrow end portion is partly enclosed by a first input electrode 173a that is curved.

The sensor data lines 171b and 171d transmit sensor data signals and extend substantially in the longitudinal direction to intersect the scanning lines 121a and 121b, the storage electrode lines 131, and the control voltage lines 122. The sensor data lines 171*b* or 171*d* are disposed adjacent to the image data lines 171*a* and turn around the second and the fourth control electrodes 124*b* and 124*c* or around the third and the fifth control electrodes 124*d* and 124*e*. Each of the sensor data lines 171*b* includes a plurality of second output electrodes 175*b* disposed on the second control electrodes 124*b* and a plurality of third output electrodes 175*d* disposed on the third control electrodes 124*d*.

The electrode members 177*c* and 177*e* are separated from the data lines 171*a* and 171*b*. Each of the electrode members 177*c* overlaps a control electrode 124*c* of a control voltage line 122 to form a sensor capacitor Cp of the photo sensing unit SC1. Each of the electrode members 177*c*/177*e* includes a second/third input electrode 173*b*/173*d* disposed on the ohmic contacts 163*b*/163*d* and a fourth/fifth output electrode 175*c*/175*e* disposed on the ohmic contacts 165*c*/165*e*. The second/third input electrode 173*b*/173*d* faces a second/third output electrode 175*b*/175*d*.

The fourth/fifth input electrodes 173*c*/173*e* are separated from the data lines 171*a*, 171*b* and 171*d* and disposed opposite the fourth/fifth output electrodes 175*c*/175*e* with respect to the fourth/fifth control electrodes 124*c*/124*e*.

A first control electrode 124*a*, a first input electrode 173*a*, and a first output electrode 175*a* along with a projection 154*a* of a semiconductor stripe 151*a* form a switching TFT Qs1 having a channel formed in the projection 154*a* disposed between the first input electrode 173*a* and the first output electrode 175*a*.

A second control electrode 124*b*, a second input electrode 173*b*, and a second output electrode 175*b* along with a semiconductor island 154*b* form a switching TFT Qs2 having a channel formed in the semiconductor island 154*b* disposed between the second input electrode 173*b* and the second output electrode 175*b*.

A third control electrode 124*d*, a third input electrode 173*d*, and a third output electrode 175*d* along with a semiconductor island 154*d* form a switching TFT Qs3 having a channel formed in the semiconductor island 154*d* disposed between the third input electrode 173*d* and the third output electrode 175*d*.

A fourth control electrode 124*c*, a fourth input electrode 173*c*, and a fourth output electrode 175*c* along with a semiconductor island 154*c* form a photosensor TFT Qp1 having a channel formed in the semiconductor island 154*c* disposed between the fourth input electrode 173*c* and the fourth output electrode 175*c*.

A fifth control electrode 124*e*, a fifth input electrode 173*e*, and a fifth output electrode 175*e* along with a semiconductor island 154*e* form a driving TFT Qp2 having a channel formed in the semiconductor island 154*e* disposed between the fifth input electrode 173*e* and the fifth output electrode 175*e*.

The data conductors 171*a*, 171*b*, 171*d*, 173*c*, 173*e*, 175*a*, 177*c* and 177*e* are preferably made of refractory metal such as Cr, Mo, Ta, Ti, or alloys thereof. However, they may have a multilayered structure including a refractory metal film (not shown) and a low resistivity film (not shown). Good examples of the multi-layered structure are a double-layered structure including a lower Cr/Mo (alloy) film and an upper Al (alloy) film and a triple-layered structure of a lower Mo (alloy) film, an intermediate Al (alloy) film, and an upper Mo (alloy) film. However, the data conductors 171*a*, 171*b*, 171*d*, 173*c*, 173*e*, 175*a*, 177*c* and 177*e* may be made of various metals or conductors.

The data conductors 171*a*, 171*b*, 171*d*, 173*c*, 173*e*, 175*a*, 177*c* and 177*e* have inclined edge profiles, and the inclination angles thereof range about 30-80 degrees.

The ohmic contacts 161*a*, 163*b*-163*e* and 165*a*-165*e* are interposed only between the underlying semiconductor stripes and islands 151*a*, 154*b*-154*e* and 152 and the overlying data conductors 171*a*, 171*b*, 171*d*, 173*c*, 173*e*, 175*a*, 177*c* and 177*e* thereon and reduce the contact resistance therebetween.

Although the semiconductor stripes 151*a* are narrower than the image data lines 171 at most places, the width of the semiconductor stripes 151*a* becomes large near the scanning lines 121*a* and 121*b*, the storage electrode lines 131, and the control voltage lines 122 as described above, to smooth the profile of the surface, thereby preventing the disconnection of the image data lines 171*a*. Likewise, the semiconductor islands 152 disposed on the edges of the storage electrode lines 131 smooth the profile of the surface to prevent the disconnection of the sensor data lines 171*b* and 171*d* there. The semiconductor stripes and islands 151*a*, 154*b*-154*e* and 152 include some exposed portions, which are not covered with the data conductors 171*a*, 171*b*, 171*d*, 173*c*, 173*e*, 175*a*, 177*c* and 177*e*, such as portions located between the input electrodes 173*a*-173*e* and the output electrodes 175*a*-175*e*.

A passivation layer 180 is formed on the data conductors 171*a*, 171*b*, 171*d*, 173*c*, 173*e*, 175*a*, 177*c* and 177*e*, and the exposed portions of the semiconductor stripes and islands 151*a*, 154*b*-154*e* and 152.

The passivation layer 180 includes a lower passivation film 180*p* preferably made of inorganic insulator such as silicon nitride or silicon oxide and an upper passivation film 180*q* preferably made of organic insulator. The organic insulator preferably has dielectric constant less than about 4.0 and it may have photosensitivity. The upper passivation film 180*q* has a plurality of openings exposing portions of the lower passivation film 180*p* and it has unevenness on its surface. The passivation layer 180 may have a single-layer structure preferably made of inorganic or organic insulator.

The passivation layer 180 has a plurality of contact holes 183*c* exposing the fourth input electrodes 173*c*, a plurality of contact holes 183*e* exposing the fifth input electrodes 173*e*, and a plurality of contact holes 185 exposing the expansions 177*a* of the first output electrodes 175*a*. The contact holes 183*c*, 183*e* and 185 may have inclined or stepped sidewalls.

In addition, portions of the upper passivation film 180*q* disposed on the semiconductor islands 154*c* are removed such that the semiconductor islands 154*c* sufficiently receive ambient light. Furthermore, the upper passivation film 180*q* shown in FIG. 10 has a plurality of depressions 189 disposed near the third gate electrodes 124*d*.

A plurality of pixel electrodes 190, a plurality of input voltage lines 88, and a plurality of switch electrodes 196 are formed on the passivation layer 180.

Each of the pixel electrodes 190 has unevenness following the unevenness of the upper passivation film 180*q* and includes a transparent electrode 192 and a reflective electrode 194 disposed thereon. The transparent electrode 192 is preferably made of transparent conductor such as ITO or IZO, and the reflective electrode 194 is preferably made of Al, Ag, Cr, or alloys thereof. However, the reflective electrode 194 they may have a dual-layered structure including a low-resistivity, reflective upper film (not shown) preferably made of Al, Ag, or alloys thereof and a good contact lower film (not shown) preferably made of Mo containing metal, Cr, Ta, or Ti having good contact characteristics with ITO or IZO.

The reflective electrode 194 has a transmissive window 195 disposed in an opening of the upper passivation film 180*q* and exposing the transparent electrode 192.

The pixel electrodes 190 are physically and electrically connected to the first output electrodes 175*a* through the contact holes 185 such that the pixel electrodes 190 receive data voltages from the first output electrodes 175a. The pixel electrodes 190 supplied with the image data voltages generate electric fields in cooperation with a common electrode 270 of the common electrode panel 200 supplied with a common voltage Vcom, which determine the orientations of liquid crystal molecules of the liquid crystal layer 3 disposed between the two electrodes 190 and 270. A pixel electrode 190 and the common electrode 270 form a LC capacitor Clc, which stores applied voltages after the switching TFT Qs1 turns off.

A pixel of the panel assembly 300 including the TFT array panel 100, the common electrode panel 200, the LC layer 3, etc., can be divided into a transmissive region TA and a reflective region RA defined by a transparent electrode 192 and a reflective electrode 194, respectively. In detail, the transmissive region TA includes portions disposed on and under the transmissive windows 195, while the reflective region RA includes portions disposed on and under the reflective electrodes 194. In the transmissive region TA, light incident from a rear surface of the panel assembly 300, i.e., from the TFT array panel 100 passes through the LC layer 3 and goes out of a front surface, i.e., out of the common electrode panel 200, thereby displaying images. In the reflective regions RA, light incident from the front surface enters into the LC layer 3, is reflected by the reflective electrode 194, passes through the LC layer 3 again, and goes out of the front surface, thereby displaying images. At this time, the unevenness of the reflective electrode 194 enhances the efficiency of the light reflection.

A pixel electrode 190 and an expansion 177a of a first output electrode 175a connected thereto overlap a storage electrode line 131 including a storage electrode 137 to form a storage capacitor Cst, which enhances the voltage storing capacity of the liquid crystal capacitor.

The pixel electrodes 190 overlap the scanning lines 121a and 121b, the image data lines 171a, the control voltage lines 122, and the TFTs Qs1 to increase the aperture ratio.

The input voltage lines 88 transmit a sensor input voltage and extend substantially in the longitudinal direction to intersect the scanning lines 121a and 121b, the storage electrode lines 131, and the control voltage lines 122. The input voltage lines 88 have a width wider than the sensor data lines 171b and cover the sensor data lines 171b. However, there is no input voltage line near the sensor data lines 171d.

Each of the input voltage lines 88 includes a lower film 88p and an upper film 88q, but it may have a single layer structure. The lower film 88p is formed of the same layer as the transparent electrodes 192, and the upper film 88q is formed of the same layer as the reflective electrodes 194.

The input voltage lines 88 are connected to the fourth input electrodes 173c through the contact holes 183c to transmit the sensor input voltage to the fourth input electrodes.

Each of the switch electrodes 196 also includes a transparent electrode 196p and a reflective electrode 196q, and the switch electrode 196 shown in FIG. 10 has a portion disposed on a depression 189. The transparent electrode 196p is made of the same layer as the transparent electrodes 192 of the pixel electrodes 190, and the reflective electrode 196q is made of the same layer as the reflective electrodes 194 of the pixel electrodes 190.

The switch electrodes 196 are physically and electrically connected to the fifth input electrodes 173e through the contact holes 183e, and the switch electrodes 196 and the fifth input electrodes 173e are electrically floating.

A description of the common electrode panel 200 is provided below.

A light blocking member 220 referred to as a black matrix for preventing light leakage is formed on an insulating substrate 210 such as transparent glass or plastic. The light blocking member 220 defines a plurality of open areas facing the pixel electrodes 190. In addition, the light blocking member 220 has a plurality of openings 225 facing the semiconductor islands 154c for exposing the semiconductor islands 154c to ambient light.

A plurality of color filters 230 are also formed on the substrate 210 and they are disposed substantially in the open areas enclosed by the light blocking member 220. The color filters 230 may extend substantially along the longitudinal direction along the pixel electrodes 190 to form stripes. Each of the color filters 230 may represent one of the primary colors such as red, green and blue colors. Hereinafter, the pixel electrodes 190 facing the red, green, and blue color filters are referred to as red, green, and blue pixel electrodes, respectively, and the pixels including the red, green, and blue color filters are referred to as red, green, and blue pixels, respectively. Reference numerals RP, GP and BP denote both the red, green, and blue pixels and their pixel electrodes, respectively.

An overcoat 250 is formed on the color filters 230 and the light blocking member 220. The overcoat 250 is preferably made of (organic) insulator and it protects the color filters 230, prevents the color filters 230 from being exposed, and provides a flat surface.

A common electrode 270 is formed on the overcoat 250 and the common electrode 270 includes a lower electrode 270p and an upper electrode 270q. The lower electrode 270p and the upper electrode 270q are preferably made of transparent conductive material such as ITO and IZO. The lower electrode 270p has a thickness of about 0.05-0.1 microns, and the upper electrode 270q has a thickness of about 0.05-0.2 microns. The lower electrode 270p may be omitted.

A plurality of spacer members 240 and a plurality of columnar spacers 320 are formed between the lower electrode 270p and the upper electrode 270q, and thus the upper electrode 270q also includes high portions disposed on the spacer members 240. The spacer members 240 and the spacers 320 are preferably formed of an organic insulator material. The spacer members 240 shown in FIG. 10 have substantially the same height as the spacers 320, while the spacer members 240 shown in FIG. 11 are shorter than the spacers 320.

The spacer members 240 and the high portions of the upper electrode 270q face the switch electrodes 196 with interposing a gap t, and the switch electrodes 196 and the high portions of the upper electrode 270q form a switch SW shown in FIG. 4. The gap t may be equal to about 0.1-1.0 microns, which can be stably obtained since the depth of the depression 189 shown in FIG. 10 and the height of the spacer members 240 may be effectively controlled without large deviation as compared with the amount of light for forming the depression.

When a pressure is exerted on the common electrode panel 200 by a user's finger or stylus, a high portion of the upper electrode 270q touches a switch electrode 196 to transmit the common voltage Vcom to the fifth input electrode 173e through the switch electrode 196.

The spacers 320 are disposed on the sensor data lines 171d and are not disposed on the pixel electrodes 190. The spacers 320 contact the TFT array panel 100 to prop the TFT array panel 100 and the common electrode panel 200 such that a gap between the TFT array panel 100 and the common electrode panel 200 is maintained.

Alignment layers (not shown) for aligning the LC layer 3 may be coated on inner surfaces of the panels 100 and 200, and one or more polarizers (not shown) are provided on outer surfaces of the panels 100 and 200.

The LC layer 3 may be subjected to a homeotropic alignment or a homogeneous alignment. The thickness of the LC layer 3 in the transmissive regions TA is thicker than, in particular, about twice in the reflective regions RA since there is no upper passivation in the transmissive regions TA.

The panel assembly 300 may further include a plurality of elastic spacers (not shown) for forming a gap between the TFT array panel 100 and the common electrode panel 200.

The panel assembly 300 may further include a sealant (not shown) for combining the TFT array panel 100 and the common electrode panel 200. The sealant is disposed around edges of the common electrode panel 200.

In the LCD shown in FIGS. 5-11, green and blue pixel electrodes GP and BP have substantially the same shape, while red pixel electrodes RP have a shape different from the pixel electrodes GP and BP. The green and blue pixel electrodes GP and BP are spaced apart from the switching TFT Qs2 or Qs3 and the photosensor TFT Qp1 or the driving TFT Qp2 and substantially rectangular, while the pixel electrode RP is disposed close to from the switching TFT Qs2 or Qs3 and the photosensor TFT Qp1 or the driving TFT Qp2 and has a shape of a rectangle that has a rectangularly chamfered corner near the switching TFT Qs2 and the photosensor TFT Qp.

However, the width of the red pixel electrode RP is relatively greater than the width of the green and blue pixel electrodes GP and BP so that the area of the red pixel electrode RP is substantially equal to that of the green or blue pixel electrode GP or BP. Accordingly, the distance between image data lines 171a disposed opposite each other with respect to the red pixel electrode RP, and the distance between an image data line 171a and a sensor data line 171b or an input voltage line 88 disposed opposite the image data lines 171a with respect to the red pixel electrode RP are greater than the distance between image data lines 171a disposed opposite each other with respect to the green or blue pixel electrode GP or BP. It is preferable that the transmissive areas TA of the red, green, and blue pixel electrodes RP, GP and BP are the same and the reflective areas of the red, green, and blue pixel electrodes RP, GP and BP are the same.

In this configuration, the number of the sensor data lines 171b is about one third that of the image data lines 171a, and thus the total area occupied by the sensing units SC is relatively small as compared with a configuration where each pixel PX includes a sensing unit SC, which requires the sensor data lines 171b of the same number as the image data lines 171a. In particular, since the sensor data lines 171b are opaque and the number of the sensor data lines 171b is relatively reduced, the area occupied by the transmissive area TA can be increased.

Sensor data lines 171b are covered with the input voltage lines 88 supplied with the sensor input voltage that may be constant. Then, the electrical coupling between the sensor data lines 171b and the common electrode 270 and between the sensor data lines 171b and the pixel electrodes 190 may be dramatically reduced. In addition, the electrical coupling between the sensor data lines 171b and the image data lines 171a may be also somewhat reduced.

Accordingly, the sensor data signals carried by the sensor data lines 171b are hardly affected by the swinging of the common voltage Vcom and the data voltages.

Since the sensor input voltage carried by the input voltage lines 88 is almost constant, the parasitic capacitance between the sensor data lines 171b and the input voltage lines 88 tend not to distort the sensor data signals.

Although the sensing units SC shown in FIGS. 5 and 6 are disposed between the blue pixels BP and the red pixels RP, the sensing units SC may be disposed between the green pixels GP and the blue pixels BP or between the red pixels RP and the green pixels GP.

Operation of the pressure sensing unit is described below with reference to FIGS. 12A and 12B.

Figure 12A:
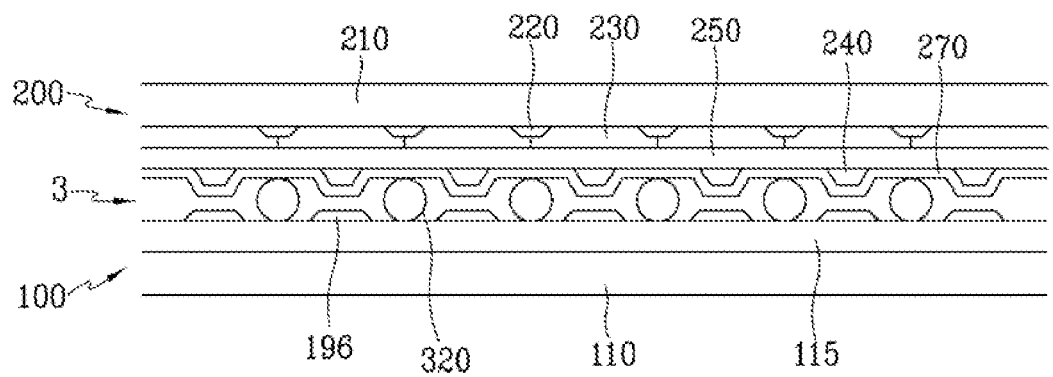
FIGS. 12A and 12B are exemplary schematic sectional views of a modification of the panel assembly shown in FIGS. 6-10 including pressure sensing units without and with a touch.
Figure 12B:
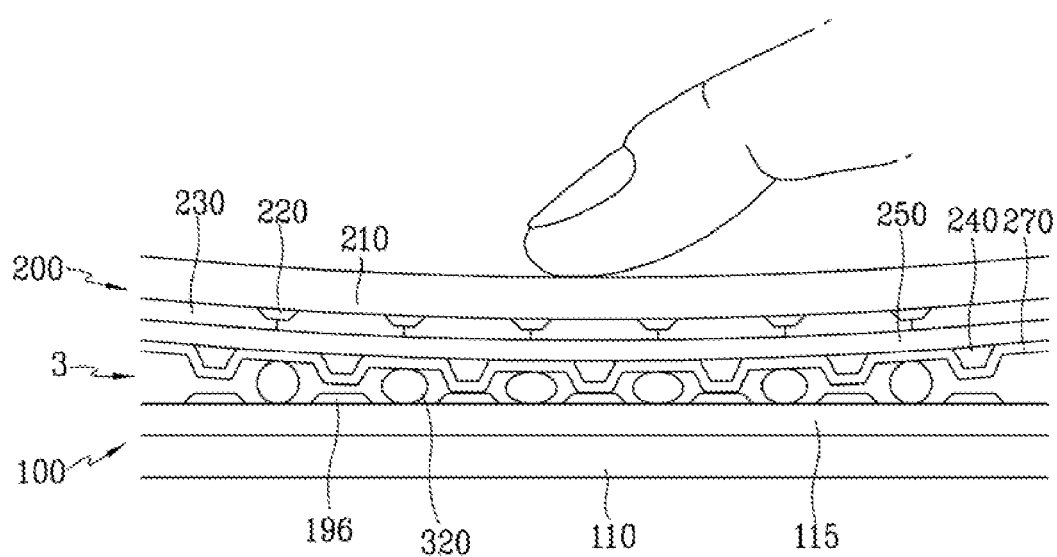

FIGS. 12A and 12B are exemplary schematic sectional views of a modification of the panel assembly shown in FIGS. 6-10 including pressure sensing units without and with a touch respectively.

Referring to FIGS. 12A and 12B, a LC panel assembly 300 includes a lower panel 100, an upper panel 200, and a plurality of elastic spacers 320 and a LC layer 3 that are disposed between the panels 100 and 200.

Regarding the lower panel 100, pixel members 115 are disposed on an insulating substrate 110. The pixel members 115 include pixels PX, photo sensing units SC1, and pressure sensing units SC2 except for switch electrodes 196.

A plurality of switch electrodes 196, which are connected to input terminals of driving transistors Qp2 in the pressure sensing units SC2, are disposed on the pixel members 115. The switch electrodes 196 may be the input terminals of the driving transistors Qp2.

Regarding the upper panel 200, a light blocking member 220, a plurality of color filters 230, and an overcoat 250 are formed on an insulating substrate 210.

A plurality of spacer members 240 are formed on the overcoat 250.

A common electrode 270 is formed on the overcoat 250 and spacer members 240. The common electrode 270 is preferably made of transparent conductive material such as ITO (indium tin oxide) and IZO (indium zinc oxide) and it is supplied with a common voltage Vcom. The common electrode 270 may include portions disposed between the spacer members 240 and the overcoat 250 like that shown in FIGS. 5-10.

The elastic spacers 320-1 prop the TFT array panel 100 and the common electrode panel 200 to form a gap therebetween. The elastic spacers 320-1 are spherical or ellipsoidal beads and spread over the panel assembly 300. Alternatively spacers 320-1 may be replaced with columnar or rigid spacers 320 shown in FIGS. 5-10.

FIG. 12A shows the panel assembly 300 without any touch. The panels 100 and 200 are spaced apart by the spacers 320-1, and thus the distance between the common electrode 270 and the switch electrodes 196 is kept constant.

FIG. 12B shows the panel assembly 300 resulting from a press by a user's finger. The upper panel 200 approaches the lower panel 100 by the pressure given by the finger. Accordingly, the distance between the common electrode 270 and the switch electrodes 196 is reduced to contact the switch electrodes 196 to the common electrode 270 such that the common voltage Vcom is transmitted to the switch electrodes 196. Then, the driving transistors Qp2 generate output currents.

Detailed structures of a photo sensing unit and a pressure sensing unit according to another embodiment of the present invention is described below in detail with reference to FIGS. 13 and 14.

Figure 13:
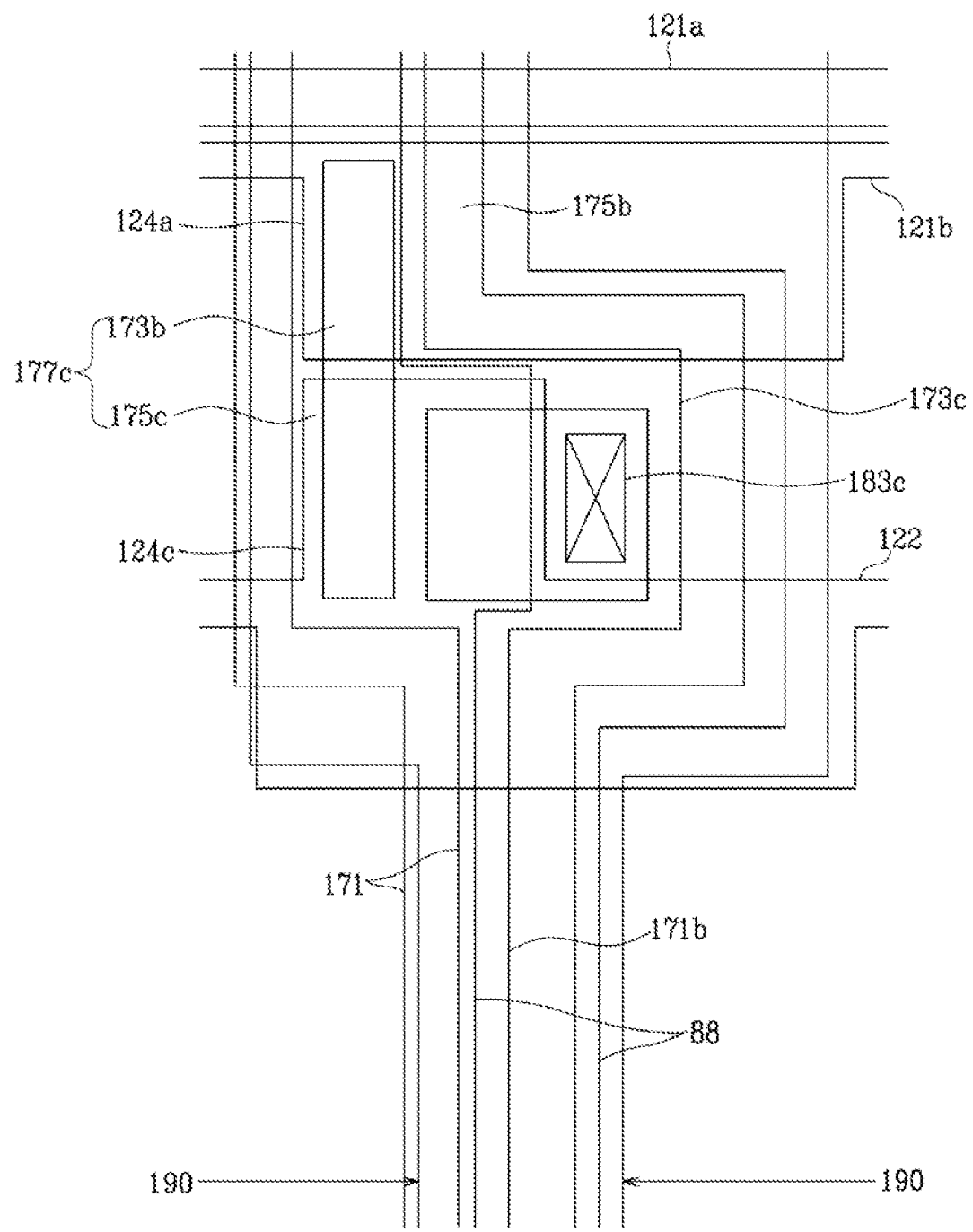
FIG. 13 is an expanded layout view of an LCD near a photo sensing unit according to another embodiment of the present invention.
Figure 14:
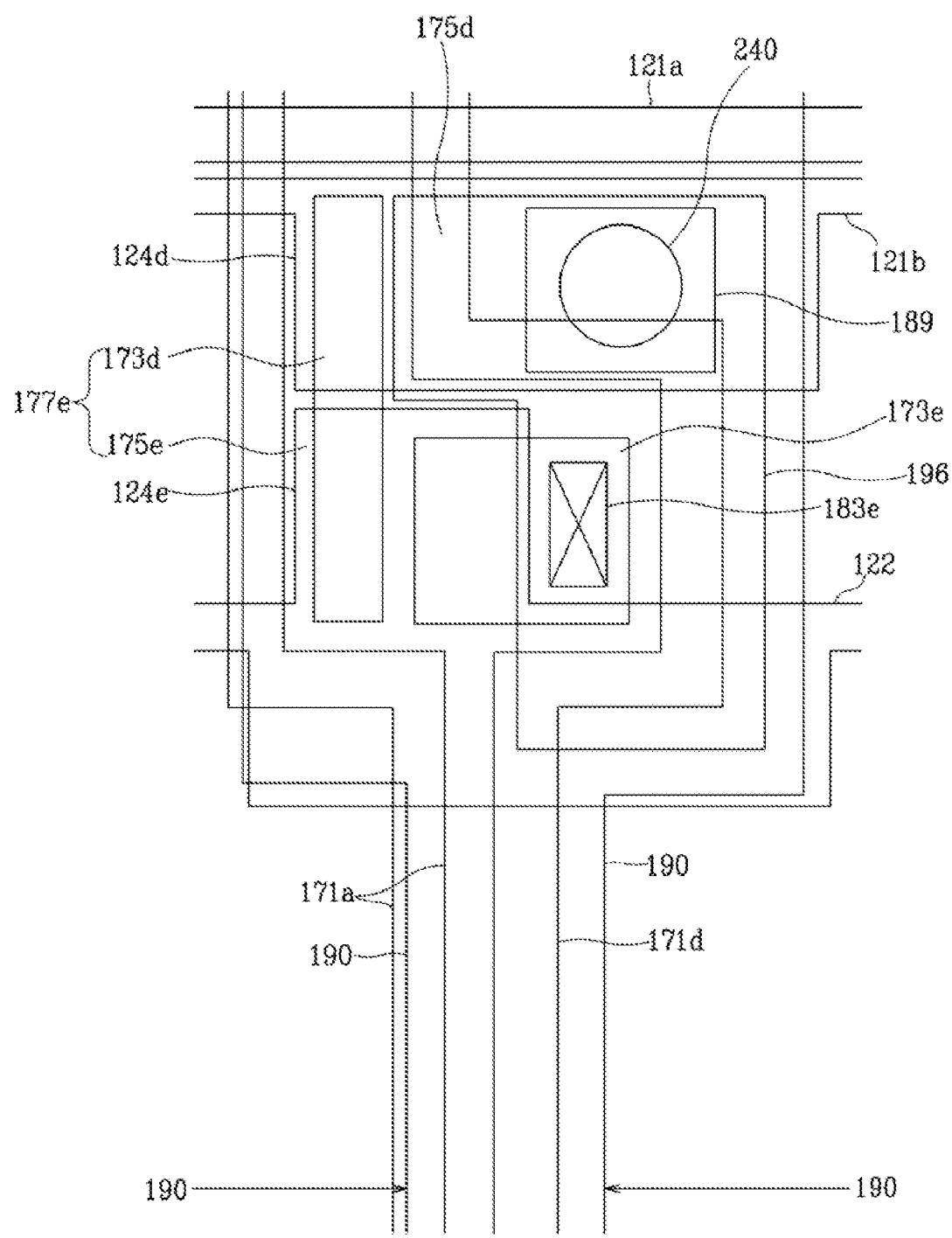
FIG. 14 is an expanded layout view of an LCD near a pressure sensing unit according to another embodiment of the present invention.

FIG. 13 is an expanded layout view of an LCD near a photo sensing unit according to another embodiment of the present invention, and FIG. 14 is an expanded layout view of an LCD near a pressure sensing unit according to another embodiment of the present invention.

FIGS. 13 and 14 only show expanded views adjacent a photo sensing unit and a pressure sensing unit since other portions of the LCD according to this embodiment have substantially the same structure as that shown in FIGS. 5-11.

Referring to FIGS. 13 and 14, a data line 171a disposed near a sensing unit turns around the sensing unit, and two pixel electrodes 190 disposed opposite the data line 171a have rectangularly chamfered corners. This configuration also increases the aperture ratio.

Now, an arrangement of the pixels and the sensing units according to another embodiment of the present invention will be described in detail with reference to FIG. 15.

Figure 15:
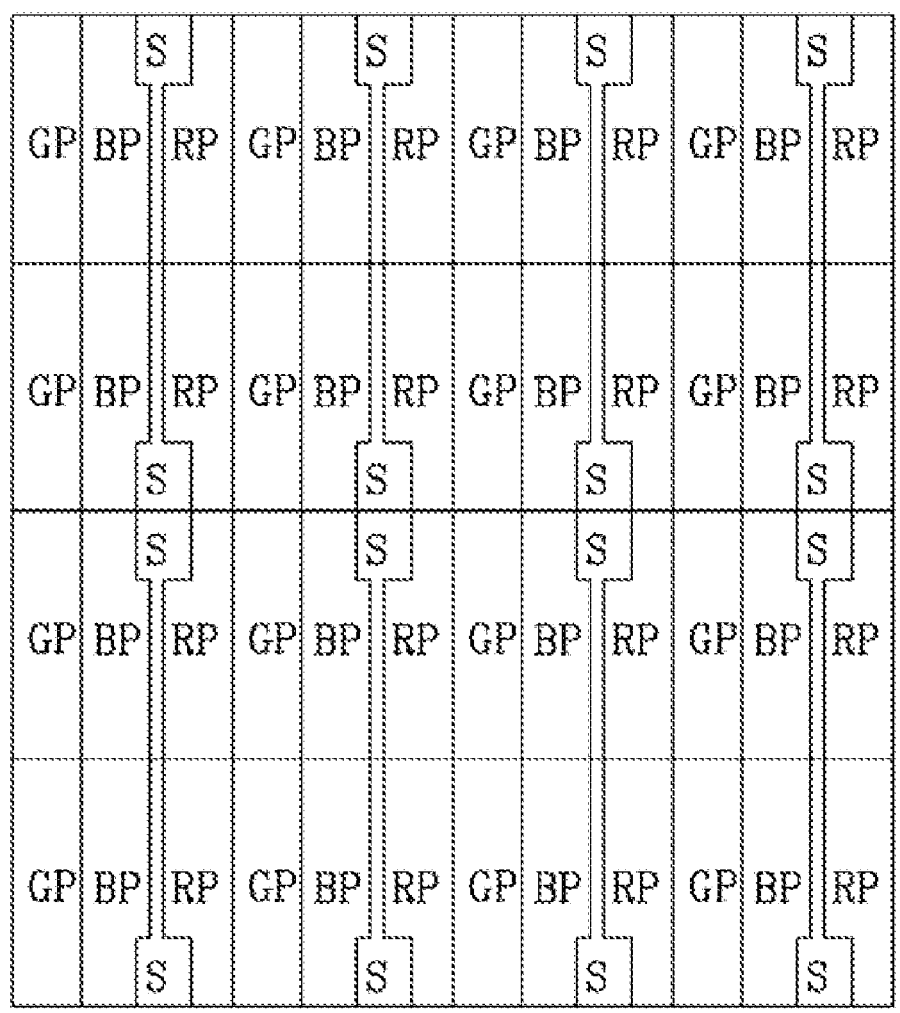
FIG. 15 is an exemplary schematic view of an LCD including the sensing units shown in FIGS. 13 and 14.

FIG. 15 is an exemplary schematic view of an LCD including the sensing units shown in FIGS. 13 and 14.

Referring to FIG. 15, the sensor areas S in two adjacent pixel rows are symmetrically arranged with respect to a boundary between the two pixel rows. The sensor areas S are disposed near the intersections of boundaries of rows and columns. Accordingly, the sensor areas S are disposed every two row boundaries, and thus the image data lines are curved every two rows. This configuration reduces the number of the curves of the image data lines to decrease the distortion of the image data signals.

Now, pressure sensing units according to other embodiments of the present invention will be described in detail with reference to FIGS. 16A, 16B and 16C.

Figure 16A:
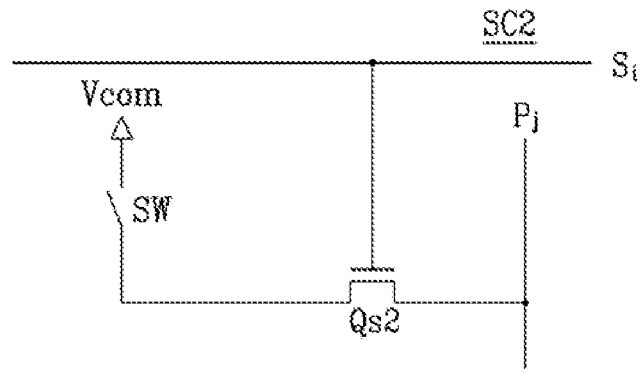
FIGS. 16A, 16B and 16C are equivalent circuit diagrams of pressure sensing units according to other embodiments of the present invention.
Figure 16B:
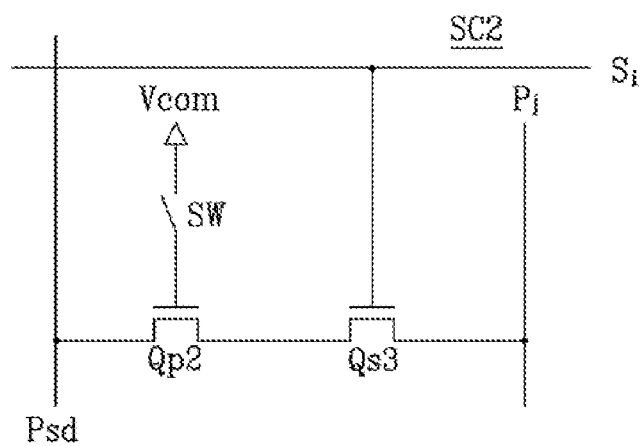
Figure 16C:
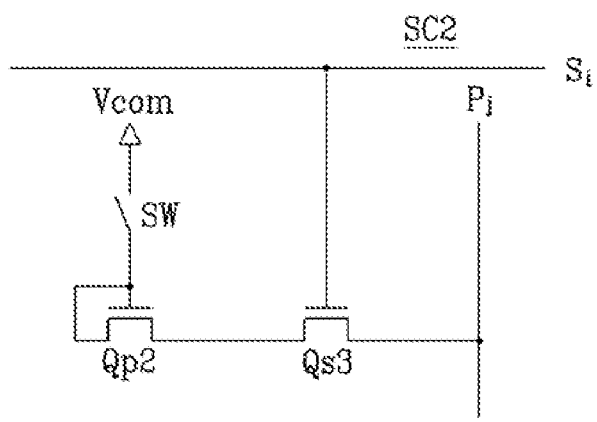

FIGS. 16A, 16B and 16C are equivalent circuit diagrams of pressure sensing units according to other embodiments of the present invention.

A pressure sensing circuit SC2 shown in FIG. 16A includes a pressure switch SW connected to a common voltage Vcom and a switching element Qs3 connected to sensing signal lines $S_i$ and $P_j$.

The switch SW connects the switching transistor Qs3 to the common voltage Vcom under a pressure following a touch exerted on the panel assembly 300.

The switching element Qs3 has three terminals, i.e., a control terminal connected to the sensor scanning line $S_i$, an input terminal connected to the output terminal of the switch SW, and an output terminal connected to the sensor data line $P_j$. The switching element Qs3 outputs the common voltage Vcom from the switch SW to the sensor data line $P_j$ as a sensor output signal in response to the sensor scanning signal from the sensor scanning line $S_i$.

A pressure sensing circuit SC2 shown in FIG. 16B includes the switch SW, the switch SW connected to the common voltage Vcom, a driving transistor Qp2 connected to an input voltage line Psd, and a switching element Qs3 connected to sensing signal lines $S_i$ and $P_j$.

The driving transistor Qp2 has three terminals, i.e., a control terminal connected to the switch SW, an input terminal connected to the input voltage line Psd, and an output terminal connected to the switching element Qs3. The driving transistor Qp2 generates and outputs an electrical current upon receipt of the common voltage Vcom from the switch SW through the control terminal.

The switching element Qs3 also has three terminals, i.e., a control terminal connected to the sensor scanning line $S_i$, an input terminal connected to the output terminal of the driving transistor Qp2, and an output terminal connected to the sensor data line $P_j$. The switching element Qs3 outputs the current from the driving transistor Qp2 to the sensor data line $P_j$ as a sensor output signal in response to the sensor scanning signal from the sensor scanning line $S_i$.

A pressure sensing circuit SC2 shown in FIG. 16B includes the switch SW, the switch SW and a driving transistor Qp2 connected to the common voltage Vcom, and a switching element Qs3 connected to sensing signal lines $S_i$ and $P_j$.

The driving transistor Qp2 has three terminals, i.e., a control terminal and an input terminal commonly connected to the switch SW, and an output terminal connected to the switching element Qs3. The driving transistor Qp2 generates and outputs an electrical current upon receipt of the common voltage Vcom from the switch SW.

The switching element Qs3, like the switching element Qs3 shown in FIG. 16B, outputs the current from the driving transistor Qp2 to the sensor data line $P_j$ as a sensor output signal in response to the sensor scanning signal from the sensor scanning line $S_i$.

The switches SW shown in FIGS. 16A and 16B may have a structure shown in FIGS. 5-11.

The above-described embodiments can be also applied to other display devices such as organic light emitting diode display, field emission display, plasma display panel, etc.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A display device comprising:
   a first substrate;
   a second substrate facing the first substrate;
   a plurality of image scanning lines disposed on the second substrate;
   a plurality of image data lines disposed on the second substrate and intersecting the image scanning lines;
   a plurality of first thin film transistors connected to the image scanning lines and the image data lines;
   a plurality of pixel electrodes coupled to the first thin film transistors;
   a plurality of sensor scanning lines disposed on the second substrate;
   a plurality of sensor data lines disposed on the second substrate and intersecting the sensor scanning lines; and
   a plurality of second thin film transistors connected to the sensor scanning lines and the sensor data lines,
   wherein at least some of the pixel electrodes have recessed portions while others of the pixel electrodes do not, the pixel electrodes with recessed portions each having the same surface area as one of the others of the pixel electrodes, and wherein ones of the second thin film transistors are disposed in corresponding recesses of respective ones of the at least some of the pixel electrodes.

2. The display device of claim 1, further comprising:
   a plurality of control voltage lines disposed on the second substrate;
   a plurality of input voltage lines disposed on the second substrate; and
   a plurality of third thin film transistors connected to the control voltage lines and the input voltage lines,
   wherein the input voltage lines and the third thin film transistors are disposed between two adjacent pixel electrodes.

3. The display device of claim 2, wherein the input voltage lines are positioned above the sensor data lines.

4. The display device of claim 3, wherein the input voltage lines and the pixel electrodes are constructed using a common layer of material.

5. The display device of claim 2, wherein the image data lines include first data lines adjacent to the second and the third thin film transistors and curve around the second and the third thin film transistors and the sensor data lines.

6. The display device of claim 2, wherein the two adjacent pixel electrodes have different shapes.

7. The display device of claim 1, wherein the first and second thin film transistors are comprised of amorphous silicon or polysilicon.

* * * * *